United States Patent
Taniguchi et al.

[11] Patent Number: 6,033,810
[45] Date of Patent: Mar. 7, 2000

[54] MOLDED ARTICLES USING GLASS AS SUBSTRATE, SUCH AS HOLOGRAPHIC OPTICAL ELEMENT, OPTICAL REFLECTOR AND ENCODER, AND METHOD OF PRODUCING THESE ARTICLES

[75] Inventors: Yukio Taniguchi; Tsuyoshi Hotta; Yuko Kuwabara; Hideaki Morita; Toshikazu Segawa, all of Tokyo, Japan

[73] Assignee: Dai Nippon Printing Co., Ltd., Tokyo, Japan

[21] Appl. No.: 08/859,910

[22] Filed: May 21, 1997

Related U.S. Application Data

[62] Division of application No. 08/597,400, Feb. 8, 1996, abandoned, which is a division of application No. 08/149,951, Nov. 10, 1993, Pat. No. 5,543,228.

[30] Foreign Application Priority Data

| Nov. 10, 1992 | [JP] | Japan | 4-300012 |
| Nov. 10, 1992 | [JP] | Japan | 4-300013 |
| Apr. 20, 1993 | [JP] | Japan | 5-092658 |
| Apr. 20, 1993 | [JP] | Japan | 5-092659 |

[51] Int. Cl.[7] .................................................. G03H 1/02
[52] U.S. Cl. ................................ 430/2; 430/1; 430/321; 369/3; 369/44.23; 369/44.26
[58] Field of Search ................................. 430/1, 2, 321; 309/44.23, 3, 44.26

[56] References Cited

U.S. PATENT DOCUMENTS

| 4,506,953 | 3/1985 | Shimizu et al. | 350/276 R |
| 4,677,285 | 6/1987 | Taniguchi | 430/1 |
| 4,707,431 | 11/1987 | Umehara | 430/945 |
| 4,716,063 | 12/1987 | Uehara et al. | 430/945 |
| 4,946,533 | 8/1990 | Kushibiki et al. | 430/2 |
| 5,015,835 | 5/1991 | Ohuchida et al. | 369/44.23 |
| 5,121,371 | 6/1992 | Farnsworth et al. | 369/44.26 |
| 5,336,585 | 8/1994 | Takahashi et al. | 430/284 |
| 5,453,961 | 9/1995 | Brazas | 369/44.23 |
| 5,543,228 | 8/1996 | Taniguchi et al. | 430/2 |

FOREIGN PATENT DOCUMENTS

| 60-164701 | 8/1985 | Japan | 430/1 |

OTHER PUBLICATIONS

Marchant, Alan B., "Optical Recording: A Technical Review", Addison–Wesley Publ. Co. Inc., pp. 166–167, 1990.

*Primary Examiner*—Martin Angebranndt
*Attorney, Agent, or Firm*—Sughrue, Mion, Zinn, Macpeak & Seas, PLLC

[57] ABSTRACT

A holographic optical element or other similar molded article using glass as a substrate is improved in the adhesion between the glass substrate and a resin layer formed thereon so that neither peeling nor change of properties will occur. A holographic optical element (4) is adapted to generate interference fringes of the same pitch as that of tracks formed on a magnetic recording disk or repeated patterns formed on an encoder by interference between two light beams emerging from two different holographic lens regions. The holographic optical element (4) includes a glass substrate (3), a radiation-cured resin layer (2) having a hologram relief pattern on the surface thereof, and a silane coupling agent layer (5) provided between the glass substrate (3) and the radiation-cured resin layer (2).

18 Claims, 17 Drawing Sheets

71a Side of region (specific line segment)

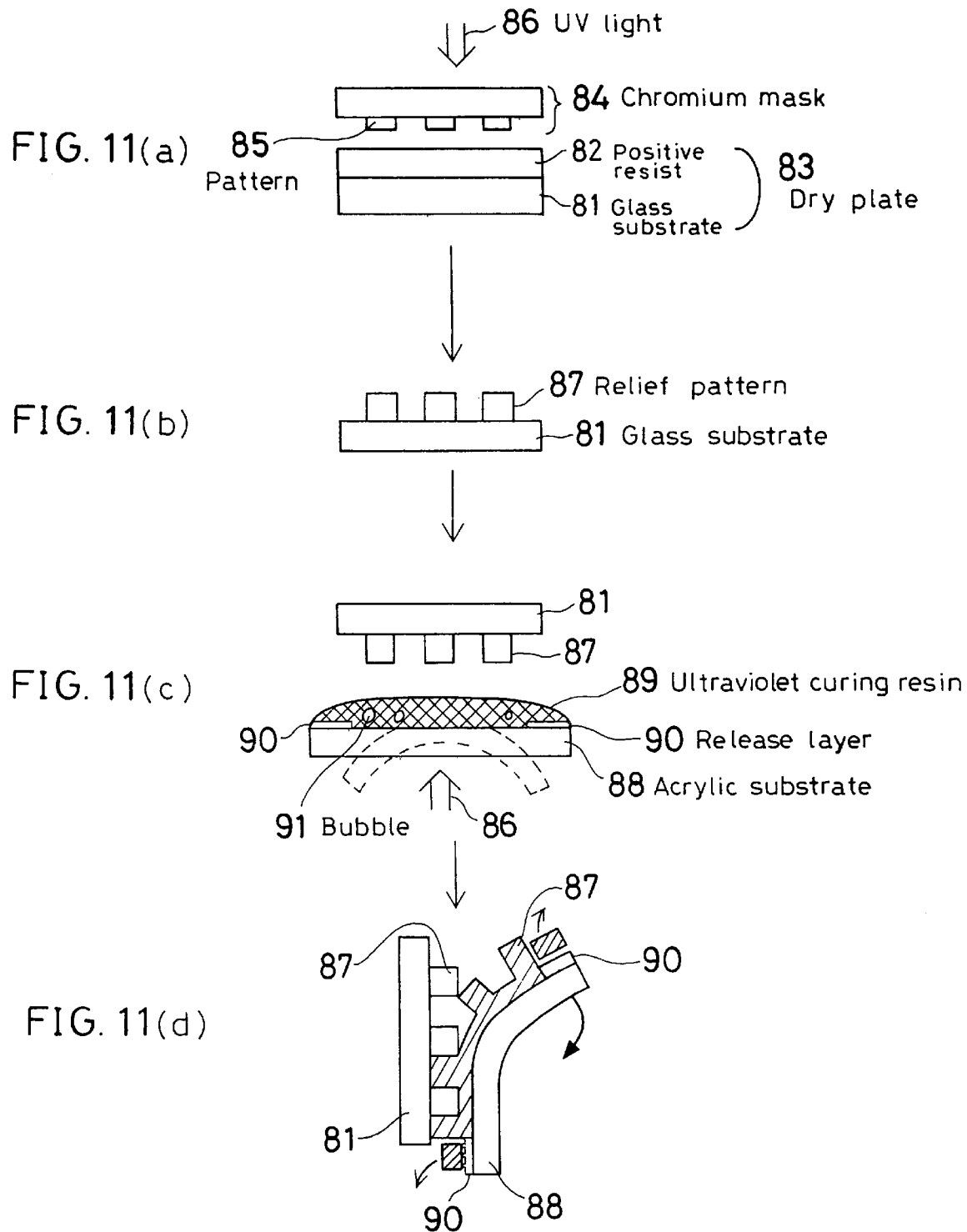

42 43    48

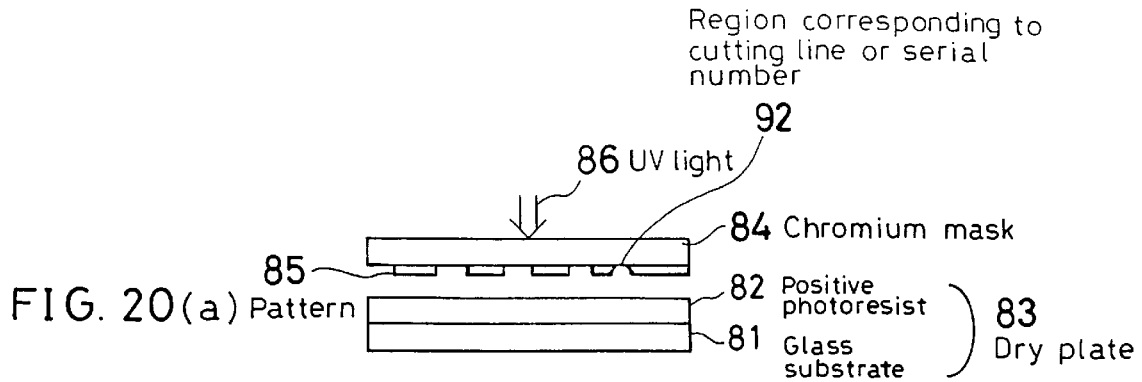
FIG. 20(a)
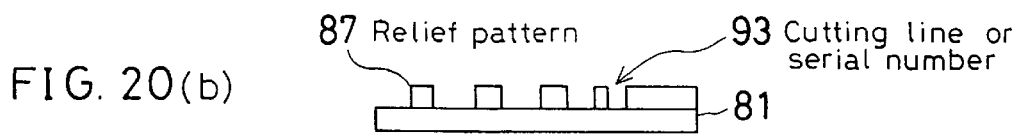
FIG. 20(b)
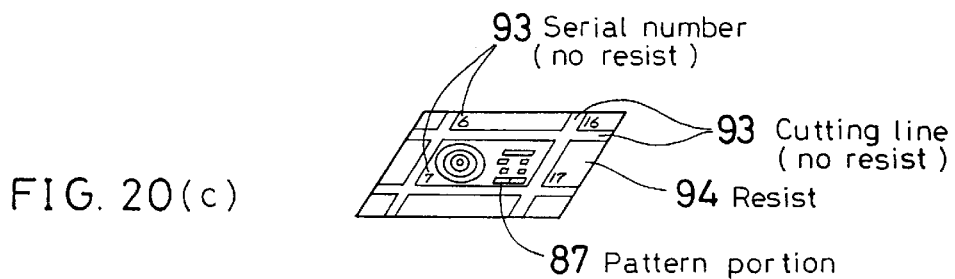
FIG. 20(c)
FIG. 21
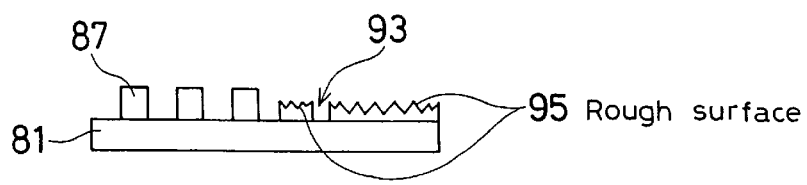

MOLDED ARTICLES USING GLASS AS SUBSTRATE, SUCH AS HOLOGRAPHIC OPTICAL ELEMENT, OPTICAL REFLECTOR AND ENCODER, AND METHOD OF PRODUCING THESE ARTICLES

This is a divisional of application Ser. No. 08/597,400, filed Feb. 8, 1996, now abandoned, which is a divisional of application Ser. No. 08/149,951, filed Nov. 10, 1993, now issued as U.S. Pat. No. 5,543,228.

BACKGROUND OF THE INVENTION

The present invention relates to molded articles using glass as a substrate, such as a holographic optical element, an optical reflector, an encoder, etc., and a method of producing these articles. More particularly, the present invention relates to a holographic optical element and an encoder for an optical servo system used to control the track position of a read/write head of a magnetic recording disk unit, and it also relates to a method of producing the holographic optical element and the encoder.

There has heretofore been proposed a method that uses a holographic optical element and an encoder to control the track position of a read/write head of a high-density magnetic recording disk unit, as disclosed in U.S. Pat. No. 5,121,371. An outline of the proposed method will be explained below with reference to FIG. 1(a). A magnetic recording disk 10 is rotated, as shown in FIG. 1(a), and a magnetic head 15 is moved and positioned in the radial direction of the magnetic recording disk 10 under the control of a controller 19 for the purpose of recording and reading information with respect to the magnetic recording disk 10. The magnetic head 15 is integrally provided with an optical track position detecting mechanism 21 which detects the position of optical tracks circumferentially provided on the magnetic recording disk 10 at a predetermined pitch. When the magnetic recording disk 10 is provided with no optical tracks, the optical track position detecting mechanism 21 detects a position relative to an encoder 48 fixed to the magnetic recording disk unit, thereby detecting the position of the magnetic tracks on the magnetic recording disk 10. The optical track position detecting mechanism 21 includes a laser diode 27, a holographic optical element 46 having a plurality of holographic thin-line regions A to H, as shown in FIG. 1(b), a deflection mirror 47, and a photodetector 50 having four elements 51 to 54, as shown in FIG. 1(c), for detecting the optical signal reflected from the magnetic recording disk 10 or the encoder 48. In addition, the optical track position detecting mechanism 21 has a lens or a holographic optical element (not shown) for converging the optical signal reflected from the magnetic recording disk 10 or the encoder 48 on the photodetector 50.

The principle of the optical track position detecting mechanism 21 is as follows. The thin-line regions A to H of the holographic optical element 46 are paired: for example, A and B; C and D; E and F; and G and H. Each of the paired regions is provided with a hologram formed by cutting a thin-line region from one holographic lens (i.e., Fresnel zone plate-shaped imaging and collecting hologram), which is used to converge light on the surface of the magnetic recording disk 10 or the encoder 48, at a position corresponding to the region concerned. Among the rays of light emitted from the laser diode 27, convergent light beams passing through the regions A and B, for example, are reflected at the upper reflecting surface of the deflection mirror 47 and interfere with each other on the recording surface of the magnetic recording disk 10, producing interference fringes of the same pitch as that of the tracks on the magnetic recording disk 10. Accordingly, the reflected light from the surface of the magnetic recording disk 10 is intensity-modulated sinusoidally by the phase difference between the interference fringes and the tracks. Therefore, by detecting the intensity of the reflected light with the element 51, for example, of the photodetector 50, the track position can be detected. In the case of FIG. 1, convergent light beams passing through the regions C and D are also reflected at the upper reflecting surface of the deflection mirror 47 and interfere with each other on the recording surface of the magnetic recording disk 10, producing interference fringes of the same pitch as that of the tracks on the magnetic recording disk 10. However, the interference fringes are 90° out of phase with respect to the interference fringes produced by the light beams passing through the regions A and B. Therefore, by using the two signals, which are 90° out of phase with respect to each other, the direction of travel of the magnetic head 15 can be distinguishably detected.

On the other hand, convergent light beams passing through the paired hologram thin-line regions E and F, and G and H are reflected at the lower reflecting surface of the deflection mirror 47 and interfere with each other on the surface of the encoder 48, producing two interference fringe patterns which are of the same pitch as that of the encoder 48 but 90° out of phase with respect to each other. By detecting the reflected light from the surface of the encoder 48 with the elements 53 and 54 of the photodetector 50, the track position of the magnetic recording disk 10 can be detected. This method is employed in a case where the magnetic recording disk 10 is provided with no optical tracks.

To form such a holographic optical element 46 from a relief hologram, injection molding process, pressing process, etc. have heretofore been employed as well-known producing methods. However, it is difficult to form a relief hologram as a dimple pattern having stable optical characteristics and excellent adherability and weatherability on a substrate which is smooth and readily breakable, such as a glass substrate.

Furthermore, if an aluminum film alone is provided on a substrate to form a reflector such as the conventional encoder 48, the following problems arise:

① Since aluminum is exposed, the reflector is inferior in wear resistance.

② Since aluminum is exposed, the reflector is inferior in reflectivity.

③ Aluminum is generally inferior in adhesive power, and this tendency becomes remarkable particularly when the substrate surface is formed from a resin material.

SUMMARY OF THE INVENTION

In view of the above-described circumstances, it is an object of the present invention to provide a molded article integrally formed on a glass substrate from an ultraviolet curing resin material or the like, which is improved in adhesion between the glass substrate and the resin layer so that neither peeling nor change of properties will occur.

It is another object of the present invention to provide a holographic optical element adapted to generate interference fringes of the same pitch as that of tracks on a magnetic recording disk or that of repeated patterns on an encoder, as described above, which is improved in optical properties, adherability, weatherability, etc. so as to be practical, and to provide a method of mass-producing such a holographic optical element with ease and at reduced cost.

It is still another object of the present invention to provide an optical reflector having repeated patterns, such as an encoder, which is improved in wear resistance, adherability and light-reflecting properties.

The present invention made to attain the above-described objects will be described below in detail.

In the present invention, a computer generated hologram is used as a hologram constituting each of the regions A to H of the holographic optical element 46 shown in FIGS. 1(a)–1(c). A specific example of the computer generated hologram will be described later. For example, such a computer generated hologram is formed as follows: An electron beam resist is coated on a chromium layer grown on a substrate, and the resist is patterned by electron beam lithography and then developed. Then, the chromium layer is etched to form a chromium pattern. From the chromium pattern, a relief stamper is formed by resist development, as described later. In this case, the focal length of the hologram constituting each region is preferably not longer than 45 mm under the necessity of forming a compact system.

Assuming that the refractive index of the hologram medium is n, the intensity I of first-order diffracted light in the case of a relief hologram having a rectangular cross-section is given by $$I=|\tfrac{1}{2}\pi \times (\cos \phi - 1 + j \sin \phi) \times \{\sin 2\pi r + j(\cos 2\pi r - 1)\}|^2$$

where $\phi = 2\pi(n-1)d/\lambda$, d=depth of relief, $\lambda$=wavelength, and r=duty ratio Therefore, if the refractive index n is small, the depth d of the relief becomes deep, so that the relief is likely to chip off during duplicating process (described later). Accordingly, it is preferable that the refractive index $n_D$ for the spectral d-line by sodium should be not less than 1.45 and the relief depth d should be in the range of 0.7 $\mu$m to 1.0 $\mu$m. The ratio (duty ratio r) of the width of the projections of the relief to the pitch thereof is preferably in the range of 0.4 to 0.6 from the viewpoint of maximizing the diffraction efficiency. It should be noted that the duty ratio can be measured by observing a cross-section of a sample relief with an electron microscope or the like.

In addition, it is preferable with a view to maximizing the diffraction efficiency that the cross-section of the relief projections should be rectangular, or the angle of inclination of the side surface of the relief projections (i.e., the surface tangent to the hologram relief surface) with respect to the normal should be within 5°. If the inclination angle exceeds 5°, the desired diffraction efficiency cannot be obtained.

More specifically, regarding the diffraction efficiency, the ratio of the intensity of zero-order diffracted light to the intensity of first-order diffracted light of wavelength 785±15 nm, for example, is preferably not higher than 10%. If the intensity of zero-order diffracted light exceeds 10%, the ratio of the noise (zero-order diffracted light) to the signal (first-order diffracted light) becomes excessively high, making it difficult to detect the track position. Further, the light transmittance is preferably not lower than 80% in the wavelength range of 400 nm to 900 nm.

The smoothness of the relief surface is preferably not more than 30 $\mu$m. If the smoothness exceeds 30 $\mu$m, interference fringes produced by the interference between convergent light beams from paired regions of the holographic optical element 46 become disordered, so that it is difficult to detect the track position.

Next, the holographic optical element of the present invention will be explained with reference to FIGS. 2(a)–2(f), which shows the process sequence for producing the holographic optical element. The holographic optical element of the present invention is a molded article 4 which is produced as follows: A liquid ultraviolet or electron radiation curing resin composition 2 is filled into a space defined between a stamper 1 having a dimple relief pattern with the desired rectangular cross-section of the holographic optical element on the surface thereon and a glass substrate 3. Then, the curing resin composition 2 is cured by irradiation with ultraviolet or electron radiation which is applied from either the substrate side or the stamper side. Thereafter, the stamper 1 is separated to obtain the molded article 4. The feature of the holographic optical element resides in that a part or the whole of the curing resin composition 2 comprises a material of strong polarity, e.g., a monomer, an oligomer, or a photo-curing initiator.

In the present invention, when the resin composition 2 is to be cured by ultraviolet radiation, either the substrate 3 or the stamper 1 is required to be transparent so as to transmit ultraviolet radiation. When the resin composition 2 is to be cured by electron radiation, neither of them need to be transparent. The stamper 1 may be either a nickel stamper or a resin stamper (described later).

For the substrate 3, it is preferable to use soda glass, silica glass, borosilicate glass, crown glass,.etc. There is no specific restriction on the thickness of the substrate 3. However, if the substrate 3 is excessively thin, it is likely to break when separated from the stamper 1. Therefore, the substrate 3 preferably has a thickness of not less than 0.5 mm.

Examples of the resin composition 2 usable in the present invention include resin materials prepared by adding N-vinyl-2-pyrrolidone, tetrahydrofurfuryl acrylate, tetrahydrofurfuryl methacrylate, etc., which are of strong polarity and low viscosity, to ordinary ultraviolet or electron radiation curing resins (comprising a monomer, an oligomer, or a photo-curing initiator). It is also possible to use a resin material the whole of which comprises a resin of strong polarity, such as those described above. The resin composition 2 preferably has a relatively low viscosity because if air bubbles get mixed in the resin composition 2, they come out of it immediately, and it is therefore possible to realize duplication of low defect rate and high yield. The thickness of the resin composition 2 after molding process is preferably in the range of 5 $\mu$m to 30 $\mu$m. If the thickness is less than 5 $\mu$m, a resin material having an ultra-low viscosity is needed. However, if the viscosity is excessively low, it is difficult to realize the desired duplication as described above. On the other hand, if the thickness exceeds 30 $\mu$m, the cure shrinkage of the resin material becomes large, making it difficult to control the size of the duplicate.

When used in the present invention, oligomers are demanded to have a high glass transition temperature $T_g$, i.e., not lower than 40° C. For example, the following oligomers can be suitably used:

| | | |
|---|---|---|
| Oligoester acrylate (manufactured by Toa Gosei Chemical Industry Co., Ltd.) | Aronix M-6300 | $T_g = 44°$ C. |
| Oligoester acrylate (manufactured by Toa Gosei Chemical Industry Co., Ltd.) | Aronix M-8030 | $T_g = 41°$ C. |

| | | |
|---|---|---|
| Oligoester acrylate (manufactured by Toa Gosei Chemical Industry Co., Ltd.) | Aronix M-8060 | $T_g = 45°$ C. |

With regard to the photo-curing agent, those which are commercially available may be used, for example:

Benzyl, benzoin ethyl ether, benzophenone, benzyl dimethyl ketal, 1-hydroxycyclohexyl phenyl ketone, 2-hydroxy-2-methyl-1-phenylpropane-1-one, and tetra (t-butylperoxycarbonyl) benzophenone.

Furthermore, it is preferable to use a silane coupling agent 5 with a view to further improving the adhesion between the glass substrate 3 and the ionizing radiation curing resin composition layer 2. Examples of usable silane coupling agents are vinyl silane, acrylic silane, epoxy silane, and amino silane. Among these materials, acrylic silane is particularly preferable. Since acrylic silane has an acrylic group, it readily adheres to the acrylic part of the ionizing radiation curing resin composition layer 2.

A silane coupling agent selected from among those mentioned above is diluted with a solvent, e.g., isopropyl alcohol, so that the content of the silane coupling agent is in the range of 0.1 wt % to 2 wt %, preferably 0.3 wt % to 0.7 wt %. The resulting solution is coated on the glass substrate 3 by spin coating, dip coating, etc. to form a thin film (several to several tens of Å) and baked for 30 to 60 minutes at 110° C. to 120° C., thereby bonding the silane coupling layer to the glass substrate 3.

On the silane coupling layer, the ionizing radiation curing resin composition layer 2 is formed by the 2P process as shown in FIGS. 2(a)–2(b). Thus, it is possible to obtain a favorable holographic optical element 4 having a glass substrate in which the resin composition layer 2 will not peel off when subjected to a cycle test for heat resistance and humidity resistance.

The following is a description of one method of generating contour lines representing the interference fringes of a holographic lens constituting the above-described holographic optical element by using a computer.

For example, it is assumed that, as shown in FIG. 3, when divergent light from a point 62 of divergence on an optical axis is made incident on a holographic lens 60 having concentric interference fringes 61 recorded thereon, the diffracted light converges on a point 63 of convergence at a position off the optical axis. In this case, the interference fringes of the holographic lens, which are actually produced, are not perfect circles. Since other optical systems and so forth are interposed in actual practice, the interference fringes that converge the divergent light on one point become subtly different from prefect circles.

In the case of a computer generated hologram, a function that gives topology (optical path length) at each point on the holograph surface is approximately calculated by a polynomial. For example, the topological function $\phi$ is approximated as follows:

$$\phi = \phi(x, y) \quad (1)$$
$$= \sum\sum C_j x^m y^n \quad (j = \{(m+n)^2 + m + 3n\}/2)$$
$$= C_1 x + C_2 y + C_3 x^2 + C_4 xy + C_5 y^2 + \ldots + C_{64} xy^9 + C_{65} y^{10}$$

where x and y are orthogonal coordinates on the hologram, and $C_j$ is a constant determined for each particular hologram.

The coefficient $\epsilon_j$ in the equation (1) is determined so that light rays incident on various points on the holographic lens shown in FIG. 3 converge on the convergence point 63. It should be noted that in actual practice the wavelength $\lambda$ of light is also related. Therefore, for example, $z=\lambda\phi(x, y)$ is used as a topological function. Even if the topological function itself can be obtained in this way, what curves (contour lines) that gives isotopology will be cannot be made clear unless calculation is made for every point according to the equation (1). The calculation method conventionally employed is as follows: A region for which a contour line is to be obtained is divided into lattices, and values of points at the four corners of each lattice are obtained on the basis of the equation (1). Then, for each lattice, the height of the contour line to be drawn and the value of the points at the four corners are compared to thereby obtain points which are to be intersected. Accordingly, with the conventional method, a huge amount of data is needed.

In the present invention, contour lines (isotopological curves) are obtained on the assumption that the function that gives height (topology) has already been obtained.

The contour generating method of the present invention will be explained below. As shown in FIG. 4, a point 73 of intersection of a contour line 72 and one side 71a of a specific rectangular region 71 is calculated by successive approximation (described later). Next, a neighboring node 74 on the same contour line is obtained by successive approximation (described later) with the intersection point 73 used as a basic point, and in this way, neighboring points are successively obtained, thereby determining all approximate points of a polygon representing one contour line. Next, the above-described procedure is repeated with the height successively changed. Thus, a desired group of contour lines can be obtained. In the present invention, data on only the nodes of contour lines is obtained, as described above. Therefore, the amount of data needed is extremely small, and it is possible to achieve high accuracy without depending on the lattice size as in the conventional practice.

The system for generating contour lines includes, as shown in FIG. 5, a CPU 75 for executing arithmetic processing to obtain nodes of a polygon approximating a contour line by successive approximation, and a RAM 76 for storing various data including a program for obtaining contour lines. The system further includes the following units: an output unit 77, e.g., a printer for printing out the results of calculation, a CRT for displaying the calculation results, etc.; a keyboard-mouse input unit 78 for inputting various data; an external storage 79 stored with a program for executing the successive approximation and basic data for obtaining contour lines, e.g., topological function; and a bus 80.

Let us assume that the topological function z is expressed by $$z=f(x, y)$$

and obtain contour lines of the quantity concerned.

Symbols are defined as follows:

fx=$\delta f/\delta x$ fy=$\delta f/\delta y$ p: the normal vector $\{p=(1/fy, 1/fx)\}$ t: the tangential vector $\{t=(fy, -fx)\}$ l: the direction vector of a line segment $\Lambda$: the pitch (distance in the normal direction per unit increment of z)

$$\Lambda=\Lambda(x, y)=1/(fx^2+fy^2)^{1/2}$$

d: the length of a side of a polygon $$\{d=d(x, y)=(8e\Lambda R)^{1/2}\}$$

R: the radius of curvature $\{R=R(x, y)\}$ e: the allowable error ($\Delta \leq e\Lambda$) of the distance $\Delta=66$ (x, y) between a side of a polygon and the corresponding contour line with respect to $\Lambda$ $\epsilon$: the allowable error for the quantity Za at a contour line relative to Z at a node to be obtained ($|Z-Za|<\epsilon$)

The way of determining d will be explained below. As shown in FIG. 6($a$), d is the length of a straight line connecting a pair of adjacent points on the same contour line 72, and $\Delta$ is the maximum distance between the contour line 72 and the straight line. Assuming that the curvature radius of the contour line 72 is R, d is obtained from FIG. 6($b$) as follows:

$$R^2=(R-\Delta)^2+(d/2)^2$$

$$\Delta \approx d^2/8R (\Delta^2 \approx 0)$$

Since $\Delta \leq e\Lambda$, $d^2/8R \leq e\Lambda$ $$\therefore d=(8e\Lambda R)^{1/2}$$

Referring to FIG. 7, it is assumed that a specific line segment is l (equivalent to the side 71$a$ in FIG. 4), the height of the contour line 72 is z ($z=z_a$), and a first approximate point on the line segment l is ① ($x_0$, $y_0$). On the basis of this assumption, a second approximate point ② ($x_1$, $y_1$) is obtained as follows:

$$(x_1, y_1)=(x_0, y_0)-(z_0-z_a)\Lambda|p|/(l \cdot p)$$

Thereafter, approximate points are successively obtained as shown in the flowchart of FIG. 8:

$$(x_k, y_k)=(x_{k-1}, y_{k-1})-(z_{k-1}-z_a)\Lambda|p|l/(l \cdot p)$$

Then, a point where the height difference falls in the error range, i.e., $$|(z_{k-1}-Z_a)|<\epsilon$$

is specified as a point of intersection (node).

Next, with the above-obtained node used as a calculated basic point, neighboring nodes are successively obtained. It is assumed that when the coordinates of a calculated point are ($x_0$, $y_0$) and the tangential vector and the normal vector at this point are t and p, respectively, the first approximate point is a point ① at a distance d in the direction of the tangential vector t. Assuming that the coordinates of the first approximate point ① are ($x_1$, $y_1$), $$(x_1, y_1)=(x_0, y_0)+d \cdot t/|t|$$

Subsequent approximation is made in the direction of the normal vector p, as shown in FIG. 9. That is, as shown in the flowchart of FIG. 10, approximate points are successively obtained, i.e., ①→②→③ . . . , as follows:

$$(x_k, y_k)=(x_{k-1}, y_{k-1})-(z_{k-1}-z_a)\Lambda \cdot p/|p|$$

When a point where the following condition is satisfied is reached as a result of approximation repeated some times, it is specified as a node:

$$|(z_{k-1}-Z_a)|<\epsilon$$

With the specified node used as a calculated point, other nodes are successively obtained. In this way, one contour line is obtained.

Thereafter, the above-described processing is repeated with the height of the contour line successively changed. Thus, a group of contour lines can be obtained.

In the method of the present invention, contour lines are represented not by data of raster mode in which all data concerning each region is used as in the conventional practice but by data of vector mode in which data only on nodes of a polygon approximating each contour line is used. Accordingly, the approximation accuracy is not dependent on the smallest lattice or dot pattern size, and it is possible to achieve a high degree of accuracy without requiring a huge amount of data. Since the length of a side of a polygon approximating a contour line is determined by the curvature at that position and the amount of approximation error, contour lines can be generated extremely rationally in terms of both the amount of data and the degree of accuracy.

Next, one method of producing the stamper 1 shown in FIGS. 2($a$)–2($f$) will be explained. This is a method of forming a stamper by duplicating process, which is characterized in that a flexible material, e.g., an acrylic plate, is employed as a substrate used for duplicating a hologram relief pattern from a resist relief pattern plate so that even if a foreign matter, e.g., bubble, gets mixed in the resin material when a hologram relief pattern is duplicated, the foreign matter can be removed by forcing it out of the resin material, thereby enabling a defect-free hologram relief pattern to be produced by duplicating process.

FIGS. 11($a$)–11($d$) are views for explanation of the duplicating method of the present invention. Referring to FIG. 11($a$), a chromium mask 84, which has a hologram pattern 85 formed on a substrate, e.g., glass, by electron beam lithography on the basis of the method shown in FIGS. 4 to 10, is disposed to face a dry plate 83 having a positive resist layer 82 formed on a glass substrate 81. In this state, exposure is carried out from the chromium mask side using ultraviolet radiation (UV light) 86. As a result, the positive resist is exposed except for the region of the pattern 85. When the resist is developed, the exposed portion is removed, resulting in a relief pattern 87 being formed on the glass substrate 81, as shown in FIG. 11($b$). In this way, the chromium mask 84 is duplicated. A negative resist is also usable, as a matter of course.

Next, as shown in FIG. 11($c$), the plate (original plate) formed by the duplicating process is disposed to face an ultraviolet curing resin material 89 dropwise applied onto an acrylic substrate 88. In this state, exposure is carried out from the acrylic substrate side using UV light 86. The surface of the acrylic substrate 88 except for the effective region has previously been coated with a release layer 90. It should be noted that when the ultraviolet curing resin material 89 is dropped, bubbles 91 or other foreign matter may get mixed therein, but such foreign matter can be removed by making use of the flexibility of the acrylic substrate 88. More specifically, when the original plate and the acrylic substrate 88 are to be brought into close contact with each other, the acrylic substrate 88 is bent so that the central portion thereof first comes into close contact with the original plate, as shown by the chain line in the figure, thereby enabling the foreign matter to be forced out of the ultraviolet curing resin material 89. After the ultraviolet curing resin material 89 has been cured in the form of the relief pattern 87 by the UV light 86, the original plate and the acrylic substrate 88 are separated from each other. At this time, since the acrylic substrate 88 is flexible and coated with the release layer 90, the substrate 88 can be readily separated by bending it, as shown in FIG. 11($d$). The relief pattern plate produced by the duplicating process is used as the stamper 1 as shown in FIGS. 2(c)–2(f). Since the resin material 89 on the release layer 90 can be torn off, it can readily be removed, so that the edge of the resin relief pattern can be made smooth.

Next, one example of forming the stamper 1 by further duplicating an original plate having a relief pattern formed on a flexible acrylic substrate will be explained with reference to FIGS. 12(a)–12(f). As shown in FIG. 12(a), a chromium mask 84 having a hologram pattern 85 is formed on a substrate, e.g., glass, by electron beam lithography, and a resist 82 is stacked thereon. That is, since the chromium mask 84 is usually formed by vapor deposition or other similar process using chromium, it can be deposited to a thickness of only about 0.1 $\mu$m at most. Therefore, in order to obtain a relief having a thickness of about 0.7 $\mu$m to 1.0 $\mu$m, which is needed for the relief hologram of the present invention, the resist 82 is placed on the chromium layer, and UV light 86 is applied from the substrate side, thereby forming a relief pattern having a predetermined thickness. Next, with the relief pattern plate used as an original plate, a relief pattern 87 is formed on an acrylic substrate 88 by the method shown in FIGS. 11(a)–11(f), thereby obtaining a plate M1 (see FIG. 12(c)). Further, with the plate M1 used as an original plate, the duplicating process is repeated to produce a plurality of plates M2 each having an ultraviolet curing resin pattern formed on a flexible substrate, as shown in FIG. 12(d). Then, with each plate M2 used as an original plate, a plurality of plates M3 as shown in FIG. 12(e) are similarly formed. By using a plate M3 thus formed as the stamper 1 as shown in FIGS. 2(a)–2(f), a holographic optical element pattern is formed from a resin layer 2 on a glass substrate 3, thereby obtaining a final duplicate product.

Thus, plates each having a pattern formed on a flexible substrate, such as M1, M2 and M3, are successively formed by duplicating process from a resist relief original plate having a glass substrate, and with the duplicate plates used as original plates, holographic optical elements each having a glass substrate are produced by duplicating process. Therefore, when a plate M3, for example, is damaged to become unusable, a new plate M3 can be readily produced from a plate M2. When a plate M2 becomes unusable, a new plate M2 can be readily produced from the plate M1. Accordingly, it is unnecessary to make a new original plate, which is not easy to produce. Therefore, it is possible to save time and labor, lower the cost and cope with the demand for mass-production.

In the process of duplicating a relief plate using a flexible substrate, as shown in FIG. 13, a substrate 100 for a duplicate is made larger in size than an effective area 101 wanted to be duplicated, and the effective area 101 is coated with an adhesive layer. In addition, the area 102 other than the effective area 101, that is, the marginal area, is coated with a release agent. Then, an original plate 103 is brought into close contact with the substrate 100, and the resin material 104 is cured by exposure using ultraviolet radiation. Thereafter, the original plate 103 and the substrate 100 are separated from each other. At this time, even if the resin material 104 squeezes out of the effective area 101, since the marginal area 102 is coated with the release agent, the substrate 100 and the original plate 103 can be readily separated from each other. The resin material 104 which has squeezed out can be readily removed simply by spraying it with air by virtue of the presence of the release agent coated on the marginal area 102. In addition, the amount of resin material 104 squeezing out and adhering to the original plate 103 is relatively small. It should be noted that even when the marginal area 102 is coated with no release agent, if the effective area 101 alone is coated with an adhesive layer, substantially no resin material will adhere to the marginal area 102, which is coated with no adhesive layer. Therefore, the desired object may also be attained by coating only the effective area 101 with an adhesive layer.

The duplicating process may also be carried out as shown in FIG. 14. That is, a marginal area 107 of a resin original plate 105, that is, the area except for an effective area 106, is coated with a release agent, and a substrate 108 for a duplicate is laminated on the original plate 105 having an adhesive layer coated on the whole surface thereof with an uncured resin material interposed between the original plate 105 and the substrate 108. After the resin material has been cured by exposure using ultraviolet radiation, the original plate 105 and the substrate 108 are separated from each other. The resin material squeezing out from the effective area 106 of the original plate 105 can be readily removed simply by spraying it with air. Thus, the original plate 105 can be used for duplicating process a plurality of times as a defect-free original plate. Since the whole surface of the substrate 108 is coated with an adhesive agent, the pattern portion can be duplicated without defect. Thus, a defect-free duplicate can be obtained.

If the resin original plate 105 having been used for duplicating process a plurality of times is set on a spinner chuck table 110, as shown in FIG. 15, and cleaned with an IPA (isopropyl alcohol) cleaning fluid 111, foreign matters getting mixed in the original plate 105 during the duplicating operation can be removed, and it is also possible to minimize the force required to separate the duplicate from the original plate 105. That is, no release agent is coated, but instead the plate 105, which is a duplicate original plate, is set on the spinner chuck table 110 with the pattern side facing upward, and rotated, for example, for 10 seconds at 700 rpm for the first time, and for 30 seconds at 1,500 rpm for the second time. For the first several seconds during the cleaning process, the IPA 111 is continuously dropped on the original plate 105, and for the following several seconds, the original plate 105 is rotated with the IPA 111 being dropped thereon. Consequently, foreign matters, e.g., resin debris and dust, attached to the surface of the original plate 105 can be effectively removed. If the rotation is continued after the dropping of the IPA 111 has been stopped, the IPA 111 applied to the surface of the original plate 105 can be blown away.

Although in the foregoing description an ultraviolet curing resin material is employed as a curable resin material, it should be noted that the present invention is also applicable to a process in which an electron radiation curing resin material is employed and it is cured by irradiation with electron radiation, as a matter of course.

Incidentally, since a holographic optical element of the relief type described above is small in size, a multiplicity of relief patterns are formed on a glass substrate of about 5 inches in size, and the substrate is cut into holographic optical elements along cutting lines by using a dicing saw. The relief pattern cutting lines have heretofore been formed by printing or the like while being aligned with respect to the patterns after a multiplicity of patterns have been formed on a glass substrate. However, the conventional method needs two processing steps to form patterns and to form cutting lines and also involves a difficult operation of aligning the cutting lines with respect to the patterns. Furthermore, in a case where cutting lines alone are formed as in the conventional practice, when the products are inspected after the duplicating process and before the cutting process, it is difficult to identify a defective product after the cutting process.

In the present invention, when relief patterns are produced, cutting lines and identification symbols, e.g., serial numbers, are formed on the same surface as that where the patterns are formed. The cutting lines and serial numbers or other identification symbols, which are provided on the same surface as the relief pattern forming surface, are formed from projecting or recessed portions relative to the surroundings. Alternatively, they are provided by forming regions constituting the cutting lines and serial numbers from a rough surface and the surroundings from a mirror surface, or vice versa. By doing so, the cutting lines and identification symbols can be formed simultaneously with the formation of patterns by a single process whereby when the patterns are produced, the cutting lines and serial numbers or the like are simultaneously formed on the same surface as that where the patterns are formed, whereas in the conventional method after the patterns have been formed, the cutting lines are formed by printing while being aligned with respect to the patterns, that is, two processes are required. Thus, according to the present invention, no alignment is needed, and the cutting lines and identification symbols can be accurately formed at the desired positions. In addition, it becomes easy to identify a defective product after the cutting process.

In addition, to attain another object thereof, the present invention provides an optical reflector comprising a first layer of SiO, a second layer of Al, a third layer of SiO, a resin layer whose surface is composed of repeated patterns of mirror and rough surfaces, and a base layer, which are stacked in the mentioned order from the light entrance side.

In this case, the thickness of the first layer of SiO is preferably in the range of 100 Å to 6,000 Å, and it is also preferable for the first SiO layer to have a thickness which maximizes the reflectivity for the working wavelength. If the thickness is less than 100 Å, the reflectivity is insufficient. On the other hand, if the thickness exceeds 6,000 Å, the strength of the SiO film becomes weak, and film formation needs a great deal of time and cost.

The thickness of the Al layer should preferably be at least 800 Å. If the thickness is less than 800 Å, no sufficient reflectivity can be obtained.

The thickness of the third layer of SiO is preferably in the range of 100 Å to 600 Å from the viewpoint of maintaining the required adhesive power. If the thickness exceeds 600 Å, the adhesive power becomes weak, and the SiO undesirably fills the recesses of the rough surface of the resin layer, so that the rough surface disappears.

The base layer may be formed using glass, aluminum, polycarbonate, polyethylene terephthalate (PET), etc.

In addition, the present invention provides an encoder for use in a system for controlling the track position of a read/write head of a magnetic recording disk unit by generating on the encoder interference fringes of the same pitch as that of repeated patterns formed on the encoder by interference between two light beams. The encoder comprises a glass substrate, a deposited film layer as the outermost layer, an ultraviolet-cured resin layer whose surface is composed of repeated patterns of mirror and rough surfaces, and a silane coupling agent layer provided between the glass substrate and the ultraviolet-cured resin layer.

In this case, the thickness of the ultraviolet-cured resin layer is preferably in the range of 5 $\mu$m to 30 $\mu$m. The ultraviolet-cured resin layer is composed, for example, of an acrylic oligomer, an acrylic monomer, N-vinyl-2-pyrrolidone, and a photo-curing initiator. The silane coupling agent layer contains $\gamma$-methacryloxypropyl trimethoxy silane, for example, as a principal component. The deposited film layer is preferably composed of a SiO layer, an Al layer, and a SiO layer.

Preferably, the encoder is obtained by cutting along a cutting line formed from a relief pattern, and it is provided with an identification symbol, e.g., a serial number, formed from a relief pattern. The width of the cutting line is preferably in the range of 100 $\mu$m to 200 $\mu$m.

It is also preferable that high-reflectivity regions having a mirror surface and low-reflectivity regions having a rough surface should be alternately arranged at equal spacings, and the high- and low-reflectivity regions should be disposed at the positions of the valleys and crests, respectively, of a relief pattern, for example. The roughness Ra of the rough surface is preferably in the range of 0.08 $\mu$m to 2 $\mu$m.

The repeat pitch of the high- and low-reflectivity regions (i.e., the sum of the widths of a pair of adjacent high- and low-reflectivity regions) is within the range of 188/n±5 $\mu$m, for example, where n is an integer. In addition, it is preferable that at the wavelength of 785±15 nm the reflectivity of the high-reflectivity regions should be not lower than 75% and the reflectivity of the low-reflectivity regions should be not higher than 8% and that at the wavelength of 785±15 nm the ratio of the reflectivity of the high-reflectivity regions to the reflectivity of the low-reflectivity regions should be not lower than 9.

The encoder is produced as follows: A resist pattern formed by electron beam lithography, for example, is used as an original plate, and the pattern of the plate is stamped on a substrate by curing of an ultraviolet curing resin material, thereby forming a plate for duplication. Further, the pattern of the plate for duplication is duplicated by another ultraviolet curing resin material on a glass substrate treated with a silane coupling agent, thereby producing the desired encoder.

In this case, the formation of the resist pattern may be carried out as follows: An opaque pattern mask is formed on a transparent substrate by electron beam lithography, and a photoresist is coated on the opaque pattern mask thus formed. Then, uniform exposure is carried out from the transparent substrate side. Further, with a scattering plate laid on top of the photoresist, uniform exposure is carried out from the scattering plate side. Alternatively, after the coating of the photoresist, a scattering plate is laid on top of the photoresist, and uniform exposure is carried out from the scattering plate side. Further, uniform exposure is carried out from the transparent substrate side.

The production process may also be such that a multiplicity of encoder patterns are formed on a single substrate with cutting lines formed from relief patterns interposed between the patterns, thereby preparing an original plate, and a plate for duplication is produced by stamping the original plate. Then, the pattern of the plate for duplication is duplicated on a glass substrate treated with a silane coupling agent. Thereafter, the resulting duplicate is cut along the cutting lines. In this case, it is preferable to coat the surface of the duplicate with a protective film in advance of the cutting process.

The optical reflector of the present invention will be further explained below with reference to the drawings.

An encoder 48, which comprises an optical reflector, has grating-shaped repeated patterns, for example, as shown in FIG. 16, and each pair of adjacent regions are formed from a pair of mirror and rough surfaces 42 and 43. The encoder 48 may be used for an optical servo system which is used to control the track position of a read/write head of a magnetic recording disk unit as shown in FIG. 1.

The encoder 48 may be produced, for example, by a process such as that shown in FIGS. 2(*a*)–2(*f*). That is, as shown in FIG. 17(a), the surface of a glass substrate 30 is provided with opaque repeated patterns 31 corresponding to an encoder, and a positive photoresist 32 is coated over the patterns 31. Then, exposure light 33 is applied from the glass substrate side to expose the photoresist 32 through the openings of the repeated patterns 31. Next, as shown in FIG. 17(b), ground glass 34 is laid on top of the photoresist 32, and exposure light 35 is applied from the ground glass side to expose the photoresist 32 again. The sequence of exposure processes shown in FIGS. 17(a) and 17(b) may be reversed. That is, the photoresist 32 coated over the repeated patterns 31 may be exposed in such a manner that, with the ground glass 34 laid on top of the photoresist 32, the photoresist 32 is first exposed to the light 35 applied from the ground glass side, and then the exposure light 33 is applied from the glass substrate side to expose the photoresist 32 through the openings of the repeated patterns 31. It should be noted that exposure made through the ground glass 34 is carried out to such an extent that the desired rough surfaces will remain (unless the exposure is held down to a level at which only the surface of the photoresist 32 is decomposed, the whole photoresist 32 will be decomposed, and the desired repeated patterns 31 cannot be obtained). Thereafter, the photoresist 32 is developed. As a result, a repeated pattern structure, which has the opaque repeated patterns 31 lying on the plane of the substrate 30 and repeated photoresist patterns 32 having a rough surface and lying on the opaque repeated patterns 31, is formed, as shown in FIG. 17(c). The repeated pattern structure is plated with Ni. Thus, an Ni pattern plate 36 as shown in FIG. 17(d) is produced. The Ni pattern plate 36 is disposed to face a glass substrate 37 treated with a silane coupling agent, and an ultraviolet curing resin material 38 is dropped into the space between the two plates 36 and 37. With the two plates 36 and 37 pressed against each other, ultraviolet radiation 39 is applied from the glass substrate side, as shown in FIG. 17(e), to cure the ultraviolet curing resin material 38, and thereafter the Ni pattern plate 36 is separated. Thus, a duplicate such as that shown in FIG. 17(f) is obtained.

Examples of the ultraviolet curing resin material 38 usable in the present invention include resin materials prepared by adding N-vinyl-2-pyrrolidone, tetrahydrofurfuryl acrylate, tetrahydrofurfuryl methacrylate, etc., which are of strong polarity and low viscosity, to ordinary ultraviolet or electron radiation curing resins (comprising a monomer, an oligomer, or a photo-curing initiator). It is also possible to use a resin material the whole of which comprises a resin of strong polarity, such as those described above. The resin material 38 preferably has a relatively low viscosity because it is difficult for air bubbles to get mixed in the resin material 38 and hence possible to realize duplication of low defect rate and high yield. The thickness of the resin material 38 after molding process is preferably in the range of 5 μm to 30 μm. If the thickness is less than 5 μm, a resin material having an ultra-low viscosity is needed. However, if the viscosity is excessively low, it is difficult to realize the desired duplication as described above. On the other hand, if the thickness exceeds 30 μm, the cure shrinkage of the resin material becomes large, making it difficult to control the size of the duplicate.

When used in the present invention, oligomers are demanded to have a high glass transition temperature $T_g$, i.e., not lower than 40° C. For example, the following oligomers can be suitably used:

| | | |
|---|---|---|
| Oligoester acrylate (manufactured by Toa Gosei Chemical Industry Co., Ltd.) | Aronix M-6300 | $T_g$ = 44° C. |
| Oligoester acrylate (manufactured by Toa Gosei Chemical Industry Co., Ltd.) | Aronix M-8030 | $T_g$ = 41° C. |
| Oligoester acrylate (manufactured by Toa Gosei Chemical Industry Co., Ltd.) | Aronix M-8060 | $T_g$ = 45° C. |

With regard to the photo-curing agent, those which are commercially available may be used, for example:

Benzyl, benzoin ethyl ether, benzophenone, benzyl dimethyl ketal, 1-hydroxycyclohexyl phenyl ketone, 2-hydroxy-2-methyl-1-phenylpropane-1-one, and tetra (t-butylperoxycarbonyl) benzophenone.

Furthermore, it is preferable to use a silane coupling agent with a view to further improving the adhesion between the glass substrate 37 and the ionizing radiation curing resin composition layer 38. Examples of usable silane coupling agents are vinyl silane, acrylic silane, epoxy silane, and amino silane. Among these materials, acrylic silane is particularly preferable. Since acrylic silane has an acrylic group, it readily adheres to the acrylic part of the ionizing radiation curing resin composition layer 38.

A silane coupling agent selected from among those mentioned above is diluted with a solvent, e.g., isopropyl alcohol, so that the content of the silane coupling agent is in the range of 0.1 wt % to 2 wt %, preferably 0.3 wt % to 0.7 wt %. The resulting solution is coated on the glass substrate 37 by spin coating, dip coating, etc. to form a thin film (several to several tens of Å) and baked for 30 to 60 minutes at 110° C. to 120° C., thereby bonding the silane coupling layer to the glass substrate 37.

On the silane coupling layer, the ionizing radiation curing resin composition layer 38 is formed by the 2P process as shown in FIGS. 17(a)–17(f). Thus, it is possible to obtain an encoder which will not peel off when subjected to a cycle test for heat resistance and humidity resistance.

Although in the foregoing method the pattern plate 36 is produced by Ni-plating a repeated pattern structure including repeated photoresist patterns 32 which have a rough surface and lie on the opaque repeated patterns 31, as shown in FIG. 17(c), the repeated pattern structure as shown in FIG. 17(c) may be used as it is to repeat a duplicating process such as that shown in FIGS. 17(d) to 17(f) at least once, thereby obtaining a duplicate which is used as a resin pattern plate 36 for the duplicating process shown in FIGS. 17(d) to 17(f).

Next, the duplicate shown in FIG. 17(f) is subjected to ion bombardment treatment for improving adhesive properties from the resin layer side. Thereafter, as shown in FIG. 18, a SiO layer 50 serving as an adhesive layer is first grown on the resin layer 38, and an aluminum layer 51 serving as a reflecting film is grown on the adhesive layer 50. Finally, another SiO layer 52 serving to enhance both reflection and wear resistance is grown on the aluminum layer 51, thereby completing an optical reflector usable as the encoder 48.

It is preferable in the encoder thus produced that high-reflectivity regions having a mirror surface and low-reflectivity regions having a rough surface should be alternately arranged at equal spacings. More specifically, the repeat pitch of the high- and low-reflectivity regions (i.e., the sum of the widths of a pair of adjacent high- and low-reflectivity regions) is preferably 188/n±5 μm, where n is an integer (since the track width of the existing floppy disks is 188 µm, the repeat pitch is preferably equal to the quotient of the track width by an integer). The difference in reflectivity between the high- and low-reflectivity regions can be made by a difference in the surface roughness. Specifically, the reflectivities of the high-and low-reflectivity regions are preferably set as follows: At the wavelength of 785±15 nm, the reflectivity of the high-reflectivity regions should be not lower than 75%, while the reflectivity of the low-reflectivity regions should be not higher than 8%, and the ratio of the reflectivity of the high-reflectivity regions to the reflectivity of the low-reflectivity regions should be not lower than 9.

With the above-described layer configuration, the reflectivity and wear resistance are enhanced by the action of the SiO layer 52. In addition, the adhesion between the resin layer 38 and the reflecting film 51 is improved by the action of the SiO layer 50, so that the reflecting film 51 becomes unlikely to peel off. Since the same SiO is employed for the layers 50 and 52, it is possible to minimize the number of different kinds of material used for film formation and also minimize the scale of the equipment required for film formation.

It should be noted that the thickness of the SiO layer 50 is only required to be of the order of 100 Å to 600 Å. The thickness of the aluminum layer 51 is required to be at least 800 Å to obtain a reflectivity of not lower than 90%. The thickness of the SiO layer 52 is only required to be of the order of 100 Å to 6,000 Å at which the optical path length is a half of the working wavelength. With regard to the rough surface, the peak-to-peak value is preferably in the range of about 0.08 µm to 2 µm. If the value is less than 0.08 µm, no light is scattered. If the value exceeds 2 µm, the degree of roughness is excessively high, so that no light is scattered.

Incidentally, since a reflector, e.g., an encoder, such as that described above is small in size, a multiplicity of relief patterns are formed on a glass substrate of about 5 inches in size, and the substrate is cut into reflector elements along cutting lines by using a dicing saw. The relief pattern cutting lines have heretofore been formed by printing or the like while being aligned with respect to the patterns after a multiplicity of patterns have been formed on a glass substrate. However, the conventional method needs two processing steps to form patterns and to form cutting lines and also involves a difficult operation of aligning the cutting lines with respect to the patterns. Furthermore, in a case where cutting lines alone are formed as in the conventional practice, when the products are inspected after the duplicating process and before the cutting process, it is difficult to identify a defective product after the cutting process.

In the present invention, when reflector relief patterns are produced, cutting lines and serial numbers are formed on the same surface as that where the patterns are formed. The cutting lines and serial numbers, which are provided on the same surface as the relief pattern forming surface, are formed from projecting or recessed portions relative to the surroundings. Alternatively, they are provided by forming regions constituting the cutting lines and serial numbers from a rough surface and the surroundings from a mirror surface, or vice versa. By doing so, the cutting lines and serial numbers can be formed simultaneously with the formation of patterns by a single process whereby when the patterns are produced, the cutting lines and serial numbers are simultaneously formed on the same surface as that where the patterns are formed, whereas in the conventional method after the patterns have been formed, the cutting lines are formed by printing while being aligned with respect to the patterns, that is, two processes are required. Thus, according to the present invention, no alignment is needed, and the cutting lines and serial numbers can be accurately formed at the desired positions. In addition, it becomes easy to identify a defective product after the cutting process.

Since the cutting edge width of a dicing saw is 100 µm to 200 µm, the width of the cutting lines is preferably in the range of 100 µm to 200 µm. It should be noted that since cutting is carried out with water being sprayed, there is a likelihood that the surface SiO layer 52 may be affected. Therefore, it is preferable to provide a protective film by coating the surface with a solution of a vinyl chloride-vinyl acetate copolymer (degree of polymerization: several thousands) in methyl ethyl ketone and toluene in advance of the cutting process.

As will be clear from the foregoing description, the molded article using glass as a substrate according to the present invention is a molded article including a glass substrate and a molded form made on the glass substrate from an ionizing radiation curing resin composition containing an ionizing radiation curing compound, wherein the ionizing radiation curing compound comprises N-vinyl-2-pyrrolidone, tetrahydrofurfuryl acrylate, or tetrahydrofurfuryl methacrylate, and a layer of a silane coupling agent is provided between the layer of the ionizing radiation curing resin composition and the glass substrate.

In this case, the molded form may be in the shape of a relief, for example, a relief hologram. When the molded form is a relief hologram, it may be arranged, for example, such that the grooves of the relief hologram have a rectangular cross-sectional configuration, the depth of the grooves is in the range of 0.7 µm to 1.0 µm, and the ratio of the width of the projections of the relief hologram to the pitch thereof is in the range of 0.4 to 0.6.

It should be noted that the silane coupling agent preferably contains γ-methacryloxypropyl trimethoxy silane, for example, as a principal component. The ionizing radiation curing resin composition preferably contains an oligomer having a glass transition temperature of not lower than 40° C. The ionizing radiation curing resin composition is generally an ultraviolet curing resin composition containing a monomer, an oligomer, and a photo-curing initiator, or an electron radiation curing resin composition containing a monomer and an oligomer.

In addition, the present invention provides a holographic optical element adapted to generate interference fringes of the same pitch as that of tracks formed on a magnetic recording disk or repeated patterns formed on an encoder by interference between two light beams emerging from two different holographic lens regions. The holographic optical element is characterized by comprising a glass substrate, a radiation-cured resin layer having a hologram relief pattern on the surface thereof, and a silane coupling agent layer provided between the glass substrate and the radiation-cured resin layer.

In this case, the focal length of the holographic lens is preferably not longer than 45 mm, and the radiation-cured resin layer preferably has a thickness of 5 µm to 30 µm. In addition, the refractive index for the spectral d-line by sodium of the radiation-cured resin layer is preferably not less than 1.45.

Further, it is preferable that the relief depth of the relief pattern should be in the range of 0.7 µm to 1.0 µm, and that the ratio of the width of the relief projections of the relief pattern to the pitch thereof should be in the range of 0.4 to 0.6, and further that the cross-section of the relief projections of the relief pattern should be rectangular, or the angle of inclination of the side surface thereof which is tangent to the hologram relief surface should be within 5° with respect to the normal. In addition, it is preferable that the ratio of the intensity of zero-order diffracted light to the intensity of first-order diffracted light of wavelength 785±15 nm should be not higher than 10%, and that the light transmittance should be not lower than 80% in the wavelength range of 400 nm to 900 nm, and further that the degree of smoothness of the surface tangent to the hologram relief surface should be not more than 30 μm.

The radiation-cured resin layer preferably contains an oligomer having a glass transition temperature of not lower than 40° C. One preferred example of the radiation-cured resin layer comprises an acrylic oligomer, an acrylic monomer, N-vinyl-2-pyrrolidone, and a photo-curing initiator. The silane coupling agent layer preferably contains γ-methacryloxypropyl trimethoxy silane as a principal component.

More specifically, it is practical to form the holographic lens from a computer generated hologram. It is also practical to form the holographic lens such that the interference fringes thereof are contour lines given by a topological function φ which satisfies the following condition:

$$\phi = \phi(x, y) \quad (1)$$
$$= \sum \sum C_j x^m y^n \quad (j = \{(m+n)^2 + m + 3n\}/2)$$
$$= C_1 x + C_2 y + C_3 x^2 + C_4 xy + C_5 y^2 + \ldots + C_{64} xy^9 + C_{65} y^{10}$$

where x and y are orthogonal coordinates on the hologram, and $C_j$ is a constant determined for each particular hologram.

It should be noted that the holographic optical element is preferably obtained by cutting along a cutting line formed from a relief pattern, and that the holographic optical element is preferably provided with an identification symbol, e.g., a serial number, formed from a relief pattern.

The holographic optical element is suitably used as an imaging element for controlling the track position of a read/write head of a high-density magnetic recording disk unit, for example.

In addition, the present invention provides a method of producing a holographic optical element, which is characterized in that a resist relief pattern is formed by electron beam lithography and resist development process as an original plate, and the pattern of the plate is stamped on a substrate by curing of a radiation curing resin material, thereby forming a duplicate plate. The pattern of the duplicate plate may be further stamped to obtain another duplicate plate. Then, the pattern of the duplicate plate is duplicated by another radiation curing resin material on a glass substrate treated with a silane coupling agent.

In this case, it is practical to carry out the production method as follows: A multiplicity of holographic optical element patterns are formed on a single substrate with cutting lines formed from relief patterns interposed between the patterns, thereby preparing an original plate, and a duplicate plate is produced by stamping the original plate. Then, the duplicate plate is duplicated on a glass substrate treated with a silane coupling agent. Thereafter, the resulting duplicate is cut along the cutting lines. In this case, it is preferable to put an identification symbol, e.g., a serial number, formed from a relief pattern on each of the holographic optical element patterns formed on the same plate.

In addition, the present invention provides an optical reflector comprising a first layer of SiO, a second layer of Al, a third layer of SiO, a resin layer whose surface is composed of repeated patterns of mirror and rough surfaces, and a base layer, which are stacked in the mentioned order from the light entrance side.

In this case, the thickness of the first layer of SiO is preferably in the range of 100 Å to 6,000 Å, and it is also preferable for the first SiO layer to have a thickness which maximizes the reflectivity for the working wavelength. If the thickness is less than 100 Å, the reflectivity is insufficient. On the other hand, if the thickness exceeds 6,000 Å, the strength of the SiO film becomes weak, and film formation needs a great deal of time and cost.

The thickness of the Al layer should preferably be at least 800 Å. If the thickness is less than 800 Å, no sufficient reflectivity can be obtained.

The thickness of the third layer of SiO is preferably in the range of 100 Å to 600 Å from the viewpoint of maintaining the required adhesive power. If the thickness exceeds 600 Å, the adhesive power becomes weak, and the SiO undesirably fills the recesses of the rough surface of the resin layer, so that the rough surface disappears.

The base layer may be formed using glass, aluminum, polycarbonate, polyethylene terephthalate (PET), etc.

In addition, the present invention provides an encoder for use in a system for controlling the track position of a read/write head of a magnetic recording disk unit by generating on the encoder interference fringes of the same pitch as that of repeated patterns formed on the encoder by interference between two light beams. The encoder comprises a glass substrate, a deposited film layer as the outermost layer, an ultraviolet-cured resin layer whose surface is composed of repeated patterns of mirror and rough surfaces, and a silane coupling agent layer provided between the glass substrate and the ultraviolet-cured resin layer.

In this case, the thickness of the ultraviolet-cured resin layer is preferably in the range of 5 μm to 30 μm. The ultraviolet-cured resin layer is composed, for example, of an acrylic oligomer, an acrylic monomer, N-vinyl-2-pyrrolidone, and a photo-curing initiator. The silane coupling agent layer contains γ-methacryloxypropyl trimethoxy silane, for example, as a principal component. The deposited film layer is preferably composed of a SiO layer, an Al layer, and a SiO layer.

Preferably, the encoder is obtained by cutting along a cutting line formed from a relief pattern, and it is provided with an identification symbol, e.g., a serial number, formed from a relief pattern. The width of the cutting line is preferably in the range of 100 μm to 200 μm.

It is also preferable that high-reflectivity regions having a mirror surface and low-reflectivity regions having a rough surface should be alternately arranged at equal spacings, and the high- and low-reflectivity regions should be disposed at the positions of the valleys and crests, respectively, of a relief pattern, for example. The roughness Ra of the rough surface is preferably in the range of 0.08 μm to 2 μm.

The repeat pitch of the high- and low-reflectivity regions (i.e., the sum of the widths of a pair of adjacent high- and low-reflectivity regions) is within the range of 188/n±5 μm, for example, where n is an integer. In addition, it is preferable that at the wavelength of 785±15 nm the reflectivity of the high-reflectivity regions should be not lower than 75% and the reflectivity of the low-reflectivity regions should be not higher than 8% and that at the wavelength of 785±15 nm the ratio of the reflectivity of the high-reflectivity regions to the reflectivity of the low-reflectivity regions should be not lower than 9.

The encoder is preferably used as a position reference for controlling the track position of a read/write head of a high-density magnetic recording disk unit, for example.

The encoder is produced by a method wherein a resist pattern formed by electron beam lithography, for example, is used as an original plate, and the pattern of the plate is stamped on a substrate by curing of an ultraviolet curing resin material, thereby forming a plate for duplication. Further, the pattern of the plate for duplication is duplicated by another ultraviolet curing resin material on a glass substrate treated with a silane coupling agent, thereby producing the desired encoder.

In this case, the formation of the resist pattern may be carried out as follows: An opaque pattern mask is formed on a transparent substrate by electron beam lithography, and a photoresist is coated on the opaque pattern mask thus formed. Then, uniform exposure is carried out from the transparent substrate side. Further, with a scattering plate laid on top of the photoresist, uniform exposure is carried out from the scattering plate side. Alternatively, after the coating of the photoresist, a scattering plate is laid on top of the photoresist, and uniform exposure is carried out from the scattering plate side. Then, uniform exposure is carried out from the transparent substrate side.

The production process may also be such that a multiplicity of encoder patterns are formed on a single substrate with cutting lines formed from relief patterns interposed between the patterns, thereby preparing an original plate, and a plate for duplication produced by stamping the original plate is duplicated on a glass substrate treated with a silane coupling agent. Thereafter, the resulting duplicate is cut along the cutting lines. In this case, it is preferable to coat the surface of the duplicate with a protective film in advance of the cutting process.

In a molded article using glass as a substrate according to the present invention, a glass substrate is provided thereon with a molded form made of an ionizing radiation curing resin composition containing an ionizing radiation curing compound which comprises N-vinyl-2-pyrrolidone, tetrahydrofurfuryl acrylate, or tetrahydrofurfuryl methacrylate, and a layer of a silane coupling agent is provided between the layer of the ionizing radiation curing resin composition and the glass substrate. Accordingly, it is possible to obtain a favorable molded article in which the molded form made of the ionizing radiation curing resin composition will not readily peel off nor change its properties even if there are changes in environmental conditions, e.g., temperature change, humidity change, etc.

The holographic optical element of the present invention comprises a glass substrate, a radiation-cured resin layer having a hologram relief pattern on the surface thereof, and a silane coupling agent layer provided between the glass substrate and the radiation-cured resin layer. Accordingly, it is possible to obtain a favorable holographic optical element in which radiation-cured resin layer will not readily peel off nor change its properties even if there are changes in environmental conditions, e.g., temperature change, humidity change, etc.

The holographic optical element is produced by a method wherein a resist relief pattern formed by electron beam lithography and resist development process is used as an original plate, and the pattern of the plate is stamped on a substrate by curing of an ultraviolet curing resin material, thereby forming a duplicate plate. Alternatively, the pattern of the duplicate plate is further stamped to obtain another duplicate plate, and the pattern of the duplicate plate is duplicated by another radiation curing resin material on a glass substrate treated with a silane coupling agent. Accordingly, it is possible to mass-produce holographic optical elements with ease and at reduced cost in which radiation-cured resin layer will not readily peel off nor change its properties even if there are changes in environmental conditions, e.g., temperature change, humidity change, etc.

The optical reflector of the present invention comprises a first layer of SiO, a second layer of Al, a third layer of SiO, a resin layer whose surface is composed of repeated patterns of mirror and rough surfaces, and a base layer, which are stacked in the mentioned order from the light entrance side. Accordingly, it is possible to obtain an optical reflector having repeated patterns, e.g., an encoder, which is superior in wear resistance, bond strength and light-reflecting properties.

The encoder of the present invention comprises a glass substrate, a deposited film layer as the outermost layer, an ultraviolet-cured resin layer whose surface is composed of repeated patterns of mirror and rough surfaces, and a silane coupling agent layer provided between the glass substrate and the ultraviolet-cured resin layer. Accordingly, it is possible to obtain an encoder which is superior in wear resistance, bond strength and light-reflecting properties.

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

BRIEF DESCRIPTION OF THE DRAWINGS

FIGS. 11(a)–11(d) are sectional views showing a method of producing a resin stamper by duplicating process according to the present invention.

FIGS. 20(a)–20(c) illustrate a cutting line forming method according to the present invention.

FIG. 21 shows one example in which cutting lines are formed by a pattern of rough and mirror surfaces.

DESCRIPTION OF THE PREFERRED EMBODIMENTS

Examples of the holographic optical element and production method therefor according to the present invention, together with comparative examples, will be described below. However, it should be noted that the present invention is not limited to these examples.

EXAMPLE 1

Figure 1:
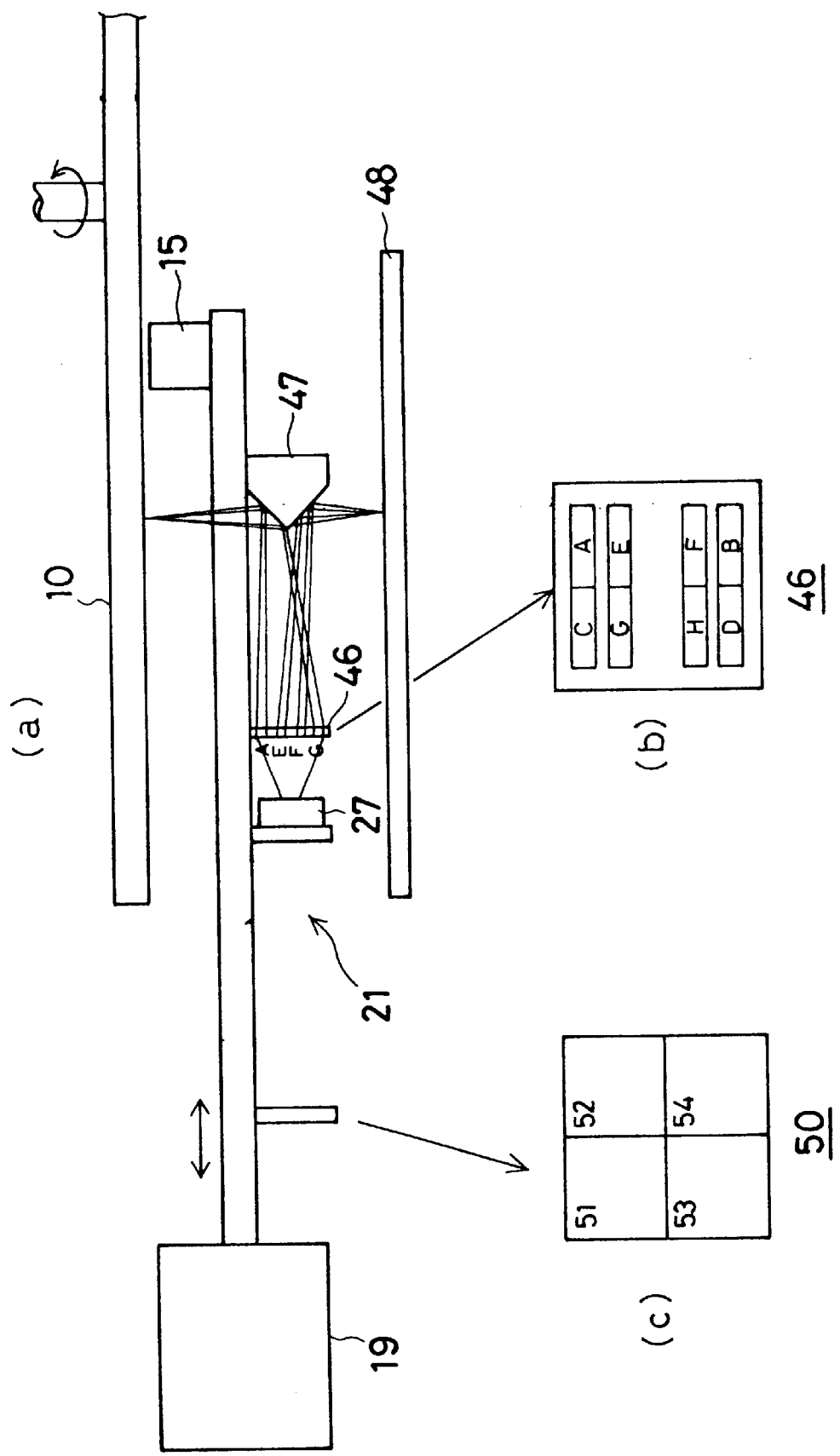
FIGS. 1(a)–1(c) illustrate an outline of a system for controlling the track position of a read/write head of a high-density magnetic recording disk unit which employs the holographic optical element of the present invention.
Figure 2:
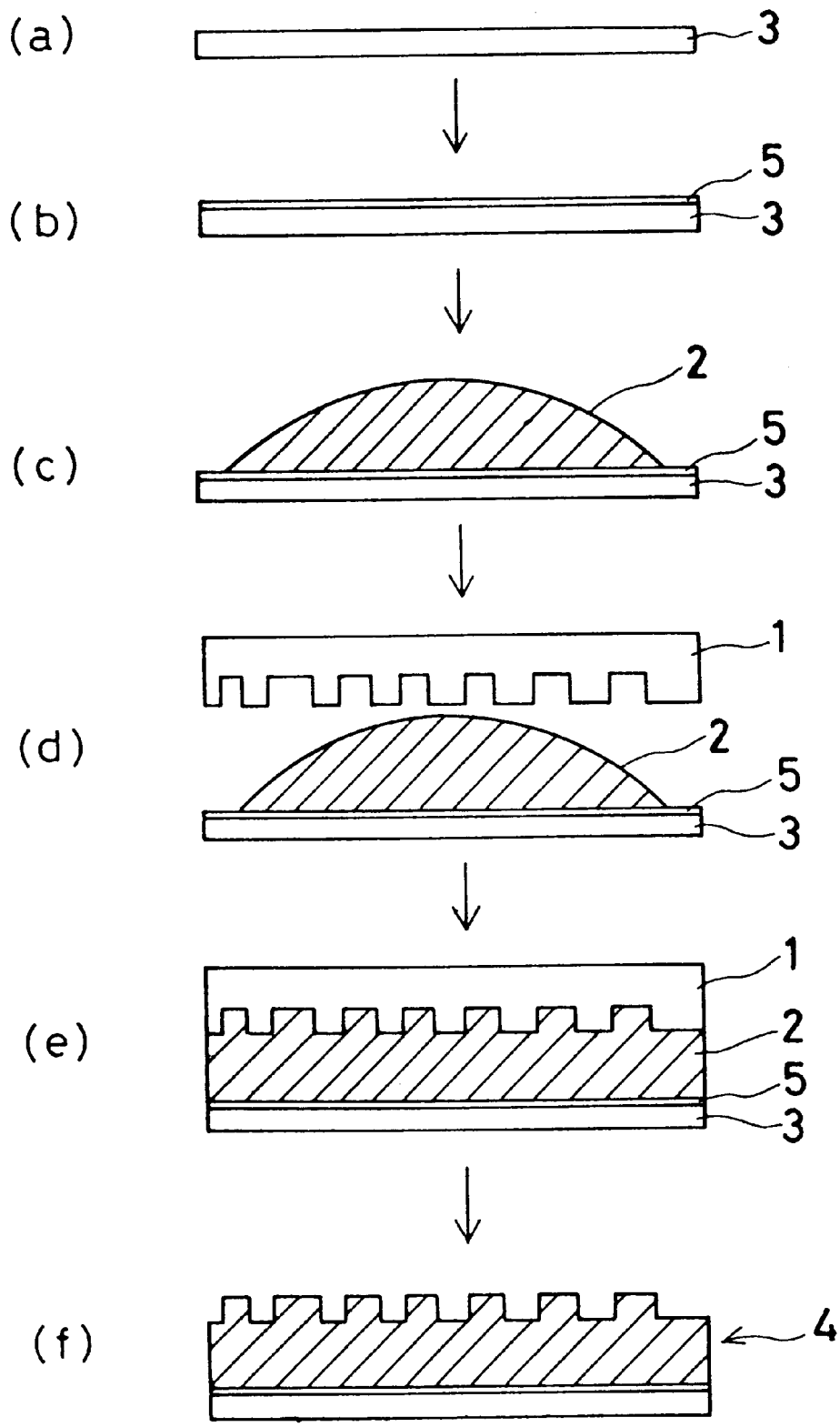
FIGS. 2(a)–2(f) are sectional view showing the process sequence for producing the holographic optical element of the present invention.

FIGS. 2(a)–2(b) are sectional views showing the process sequence for producing a holographic optical element according to the present invention, in which reference numeral 1 denotes a stamper, 2 a curable resin composition, 3 a glass substrate, 4 a molded article (holographic optical element), and 5 a silane coupling agent layer.

As shown in FIG. 2(a), a soda glass plate which was 25 by 25 cm square and 1.35 mm thick was used as a substrate 3, and the surface of the substrate 3 was treated with γ-methacryloxypropyl trimethoxy silane (KBM503, manufactured by Shinetsu Silicone K.K.). For this purpose, first, KBM503 was dissolved in isopropyl alcohol under stirring for 1 hour to obtain a 0.5 wt % solution. With 6 to 8 ml of the solution being dropped on the glass substrate 3, spin coating was carried out at 300 rpm for the first 5 seconds and then at 500 rpm for the following 15 seconds. Then, baking was carried out for 30 minutes at 120° C. to make the glass substrate 3 and the KBM 503 adhere to each other, thereby forming a silane coupling agent layer 5 on the substrate 3, as shown in FIG. 2(b).

Next, an ultraviolet curing resin composition 2 (the refractive index for the spectral d-line by sodium at 20° C.: 1.52) was prepared by mixing together 20 parts by weight of N-vinyl-2-pyrrolidone 25 parts by weight of dicyclopentenyl acrylate (FA-511A, manufactured by Hitachi Chemical Co., Ltd.), 52 parts by weight of oligoester acrylate (M-8060, manufactured by Toa Gosei Chemical Industry Co., Ltd.), and 3 parts by weight of 1-hydroxycyclohexyl phenyl ketone (Irg184, manufactured by Ciba-Geigy Ltd.). Then, 0.7 ml of the composition 2 was dropped on the silane coupling agent layer 5 provided on the substrate 3, as shown in FIG. 2(c), and a resin stamper 1 having a holographic optical element pattern was placed on the composition 2, as shown in FIG. 2(d). Then, a pressure of 6 kg/cm² was applied to the stamper 1 to spread the composition 2 in excess of the pattern region of the stamper 1, as shown in FIG. 2(e). Further, light of wavelength 365 nm emitted from an ultra-high pressure mercury lamp was applied for 30 seconds at 250 mJ/cm² from the substrate side to cure the ultraviolet curing resin composition 2.

Then, with air being applied from an ionizer, the resin stamper 1 was separated from the cured resin composition 2, thereby obtaining a favorable holographic optical element 4 with a glass substrate, as shown in FIG. 2(f). In 1 hour, 30 holographic optical elements 4 of the same specifications were obtained from the same stamper 1.

Even after being subjected to a cycle test (10 cycles) at 60° C. and −20° C. and a weatherability test (40° C. and 90% RH) for 2,000 hours, the element 4 had neither change of properties nor peeling and exhibited excellent adhesion.

EXAMPLE 2

A holographic optical element was produced in the same manner as in Example 1 except that the curable resin composition 2 contained no 1-hydroxycyclohexyl phenyl ketone (Irg184, manufactured by Ciba-Geigy Ltd.) as a photo-curing initiator and that electron radiation was applied at 10 Mrad in place of ultraviolet radiation. The resulting holographic optical element with a glass substrate had properties substantially equal to those of the element 4 obtained in Example 1.

COMPARATIVE EXAMPLE 1

A curable resin composition was prepared in the same manner as in Example 1 except that no N-vinyl-2-pyrrolidone was contained therein, and cured in the same way as in Example 1. The cured resin layer did not adhere to a glass substrate treated with a silane coupling agent, and it peeled off easily when subjected to a pressure-sensitive-tape test.

COMPARATIVE EXAMPLE 2

A holographic optical element was produced by duplicating process in the same manner as in Example 1 except that the step of providing the silane coupling agent layer 5 on the surface of the substrate 3, shown in FIG. 2(b), was omitted. The cured resin layer 2 in this example readily-peeled off the glass substrate 3.

COMPARATIVE EXAMPLE 3

A curable resin composition was prepared in the same manner as in Example 1 except that oligoester acrylate (Aronix M-6100, $T_g$=29° C., manufactured by Toa Gosei Chemical Industry Co., Ltd.) was employed as an oligomer in place of oligoester acrylate (M-8060, manufactured by Toa Gosei Chemical Industry Co., Ltd.). When the resulting holographic optical element was subjected to a weatherability test (40° C. and 90% RH), the pattern configuration deteriorated, and the diffraction efficiency markedly decreased. Accordingly, the molded article was unsuitable for use as a holographic optical element.

EXAMPLE 3

One example in which contour lines were obtained by using the equation (1) is shown below. It is assumed that the coefficient $C_j$ has previously been obtained as follows:

| | | | | | |
|---|---|---|---|---|---|
| $C_1$ | −0.004741960331; | $C_2$ | 0.000080846537; | $C_3$ | 0.048079497785 |
| $C_4$ | 0.10600822E-08; | $C_5$ | 0.048079466706; | $C_6$ | 0.000018540537 |
| $C_7$ | 0.31609798E-06; | $C_8$ | 0.000018540624; | $C_9$ | 0.31610245E-06 |
| $C_{10}$ | −0.000676044277; | $C_{11}$ | −0.14957902E09; | $C_{12}$ | −0.00135208418 |
| $C_{13}$ | −0.14958006E-09; | $C_{14}$ | −0.000676039892; | $C_{15}$ | 0.23947151E-06 |
| $C_{16}$ | 0.40828522E-08; | $C_{17}$ | 0.47894364E-06; | $C_{18}$ | 0.81656377E-08 |
| $C_{19}$ | 0.23947135E-06; | $C_{20}$ | 0.4082772E-08; | $C_{21}$ | 0.33062389E-05 |
| $C_{22}$ | −0.51492207E-11; | $C_{23}$ | 0.99188879E-05; | $C_{24}$ | 0.10300847E-10 |
| $C_{25}$ | 0.9919039E-05; | $C_{26}$ | −0.51491493E-11; | $C_{27}$ | 0.33063899E-05 |
| $C_{28}$ | 0.13362551E-08; | $C_{29}$ | 0.2278403E-10; | $C_{30}$ | 0.40087233E-08 |
| $C_{31}$ | 0.68287877E-10; | $C_{32}$ | 0.40048758E-08; | $C_{33}$ | 0.68347162E-10 |
| $C_{34}$ | 0.13360849E-08; | $C_{35}$ | 0.22780557E-10; | $C_{36}$ | −0.53020603E-07 |
| $C_{37}$ | −0.33818815E-13; | $C_{38}$ | −0.21206615E-06; | $C_{39}$ | −0.99684619E-13 |
| $C_{40}$ | −0.31819798E-06; | $C_{41}$ | −0.99701181E-13; | $C_{42}$ | −0.21206424E-06 |
| $C_{44}$ | −0.33839754E-13; | $C_{44}$ | −0.53019651E-07; | $C_{45}$ | −0.41467797E-10 |
| $C_{46}$ | −0.70805249E-12; | $C_{47}$ | −0.16619823E-09; | $C_{48}$ | −0.28158676E-11 |
| $C_{49}$ | −0.2476885E-09; | $C_{50}$ | −0.42229613E-11; | $C_{51}$ | −0.16515589E-09 |
| $C_{52}$ | −0.28335754E-11; | $C_{53}$ | −0.41527337E-10; | $C_{54}$ | 0.7069965E-12 |
| $C_{55}$ | 0.11585899E-08; | $C_{56}$ | 0.2568661E-14; | $C_{57}$ | 0.57852994E-08 |
| $C_{58}$ | 0.99672001E-14; | $C_{59}$ | 0.11601601E-07; | $C_{60}$ | 0.14778937E-13 |
| $C_{61}$ | 0.11601462E-07; | $C_{62}$ | 0.99729646E-14; | $C_{63}$ | 0.57850887E-08 |
| $C_{64}$ | 0.25722297E-14; | $C_{65}$ | 0.11585202E-08 | | |

Then, with the topological function z defined as $z = \lambda \phi(x, y)$, the above-described approximation was made for a rectangular region of x=0.5 mm to 0.8 mm and y=0.6 mm to 0.7 mm under the conditions of $\lambda$=780 nm, $e=10^{-2}$, and $\epsilon=10^{-5}$. As a result, the following contour line data was obtained. It should be noted that z denotes the height of a contour line, and (x, y) denotes a node and that the data shown below is only a part of the contour line data obtained:

spinner method at 1,500 rmp using OFPR 800, manufactured by Tokyo Oka K.K., as a photoresist, thereby preparing a relief hologram dry plate 83. Then, a chromium mask 84 comprising an amplitude hologram, which had a pattern 85 formed by digitizing interference fringes in the form of light and dark patterns, was prepared. With the pattern side of the mask 84 brought into close contact with the dry plate 83, UV light 86 was applied at 40 mJ from the mask side. Thereafter,

| | | | | | |
|---|---|---|---|---|---|
| z = 34.0 λ | x = 0.5000000 | y = 0.6004589 | z = 44.5 λ | x = 0.5000000 | y = 0.6073442 |
| | x = 0.5005901 | y = 0.6000000 | | x = 0.5095543 | y = 0.6000000 |
| z = 35 0 λ | x = 0.5000000 | y = 0.6141542 | z = 35.5 λ | x = 0.5000000 | y = 0.6208910 |
| | x = 0.5186235 | y = 0.6000000 | | x = 0.5206200 | y = 0.6053922 |
| | | | | x = 0.5273120 | y = 0.6000000 |
| z = 36.0 λ | x = 0.5000000 | y = 0.6275570 | z = 36.5 λ | x = 0.5000000 | y = 0.6341543 |
| | x = 0.5207027 | y = 0.6121638 | | x = 0.5207830 | y = 0.6188647 |
| | x = 0.5359678 | y = 0 6000000 | | x = 0.5410465 | y = 0.6028930 |
| | | | | x = 0.5444762 | y = 0.6000000 |
| z = 50.0 λ | x = 0.6330287 | y = 0.7000000 | z = 50.5 λ | x = 0.6401425 | y = 0.7000000 |
| | x = 0.6476170 | y = 0.6876742 | | x = 0.6479854 | y = 0.6934238 |
| | x = 0.6669049 | y = 0.6704143 | | x = 0.6673428 | y = 0.6762372 |
| | x = 0.6856943 | y = 0.6526130 | | x = 0.6862061 | y = 0.6585098 |
| | x = 0.7039699 | y = 0.6342846 | | x = 0.7045602 | y = 0.6402558 |
| | x = 0.7217170 | y = 0.6154441 | | x = 0.7223905 | y = 0.6214898 |
| | x = 0.7354572 | y = 0.6000000 | | x = 0.7396827 | y = 0.6022267 |
| | | | | x = 0.7415707 | y = 0.6000000 |
| z = 60.0 λ | x = 0.7626287 | y = 0.7000000 | z = 60.5 λ | x = 0.7685791 | y = 0.7000000 |
| | x = 0.7700283 | y = 0.6925007 | | x = 0.7706306 | y = 0.6979350 |
| | x = 0.7877644 | y = 0.6735654 | | x = 0.7884360 | y = 0.6790607 |
| | x = 0.8000000 | y = 0.6598023 | | x = 0.8000000 | y = 0.6661485 |
| z = 61.0 λ | x = 0.7743947 | y = 0.7000000 | z = 61.5 λ | x = 0.7801394 | y = 0.7000000 |
| | x = 0.7890972 | y = 0.6845238 | | x = 0.7897482 | y = 0.6899555 |
| | x = 0.8000000 | y = 0.6724380 | | x = 0.8000000 | y = 0.6786724 |
| z = 62.0 λ | x = 0.7859163 | y = 0.7000000 | z = 62.5 λ | x = 0.7916897 | y = 0.7000000 |
| | x = 0.7903893 | y = 0.6953560 | | x = 0.8000000 | y = 0.6909814 |
| | x = 0.8000000 | y = 0.6848531 | | | |
| z = 63.0 λ | x = 0.7972709 | y = 0.7000000 | | | |
| | x = 0.8000000 | y = 0.6970586 | | | |

Figure 19:
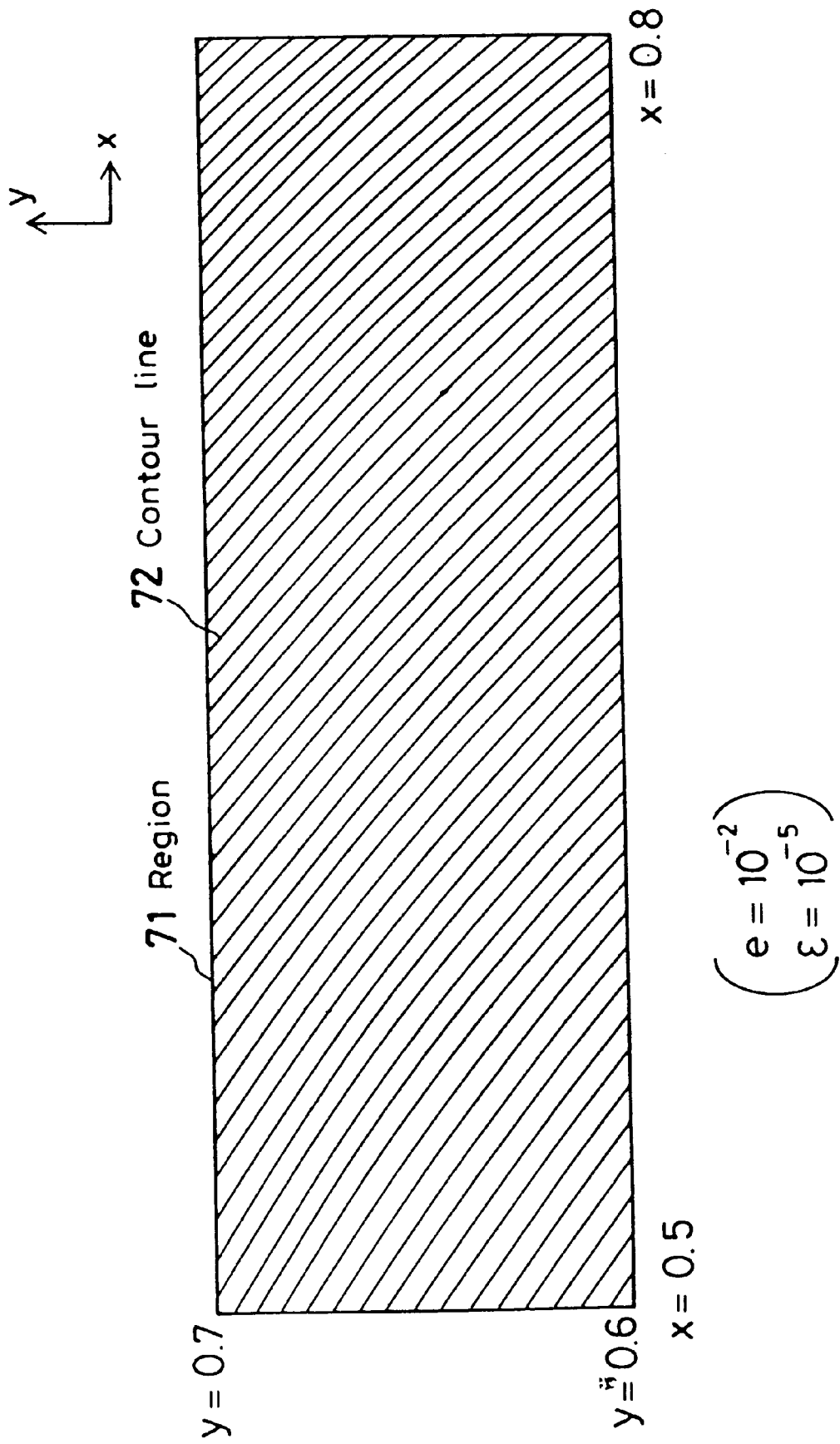
FIG. 19 shows contour lines obtained by the contour generating method according to the present invention.

Contour lines 72 such as those shown in FIG. 19 were obtained by plotting curves on the basis of the contour-line data.

EXAMPLE 4

As shown in FIG. 11(a), the surface of a glass substrate 81 was coated with a positive photoresist layer 82 by the the exposed dry plate 83 was developed by using NMD-3, manufactured by Tokyo Oka K.K., as a developer, thereby obtaining a relief hologram original plate formed with a relief pattern 87, as shown in FIG. 11(b). Then, a protective film made of polyethylene-EVA (SPV-367, manufactured by Nitto Electric Industrial Co., Ltd.) was laminated on the marginal area of an acrylic substrate 88, that is, the area other than the effective area of the substrate 88, and the effective area alone was coated with a vinyl chloride-vinyl acetate copolymer as an adhesive layer by using a spinner. Thereafter, the protective film was separated, and the marginal area was coated with a release agent (flon, 1, 3; MS=77, manufactured by Daikin Kogyo Co., Ltd.). Then, an ultraviolet curing resin material 89 was dropped on the acrylic substrate 88, and the resist original plate was brought into close contact with the ultraviolet curing resin material 89. Consequently, the ultraviolet curing resin material 89 was extruded from the portion corresponding to the photoresist pattern 87, and the spaces between the projections of the photoresist pattern 87 were filled with the ultraviolet curing resin material 89. At the same time, bubbles or other foreign matters having got mixed in the ultraviolet curing resin material 89 were forced out by virtue of the flexibility of the acrylic substrate 88. Thus, it was possible to remove such foreign matters. In this state, UV light 86 was applied at 450 mJ from the acrylic substrate side. Then, the flexible, acrylic substrate 88 was separated while being bent. Thus, it was possible to separate the substrate 88 easily without leaving any resin material on the glass substrate side, and a resin relief pattern was obtained on the acrylic substrate 88. Ultraviolet radiation was applied to the plate thus obtained to cure (polymerize) the resin material satisfactorily, thereby obtaining a flexible relief hologram resin stamper.

EXAMPLE 5

As shown in FIG. 20(*a*), the surface of a glass substrate 81 was coated with a positive photoresist layer 82 by the spinner method at 1,500 rmp using OFPR 800, manufactured by Tokyo Oka K.K., as a photoresist, thereby preparing a relief hologram dry plate 83., Then, a chromium mask 84 comprising an amplitude hologram, which had patterns 85 formed by digitizing interference fringes in the form of light and dark patterns, was prepared. With the pattern side of the mask 84 brought into close contact with the dry plate 83, UV light 86 was applied at 40 mJ from the mask side. In this case, the chromium mask 84 had already been formed with regions 92 corresponding to cutting lines and serial numbers by etching chromium.

Then, the exposed dry plate 83 was developed by using NMD-3, manufactured by Tokyo Oka K.K., as a developer, thereby obtaining a relief hologram optical element having a relief pattern 87, together with cutting lines and serial number 93, which were integrally formed on the same surface, as shown in FIG. 20(*b*). It should be noted that FIG. 20(*b*) is a sectional view, and FIG. 20(*c*) is a perspective view showing the pattern side of a relief hologram optical element. It will be understood from the figures that the cutting lines and serial numbers 93 are formed where no resist 94 is present.

EXAMPLE 6

A dry plate 83 was prepared in the same manner as in the case of FIG. 20(*a*), and a region other than an effective region where the relief pattern 87 was formed was provided with a rough surface 95, while only regions corresponding to cutting lines and serial numbers were formed from a mirror surface where no resist was present, thereby forming cutting lines and serial numbers 93, as shown in FIG. 21.

The rough surface was formed as follows: With a ground glass plate brought into close contact with the dry plate 83, UV light was applied to only the region to be roughed by using a chromium mask, and then development was carried out. It was possible to clearly identify the cutting lines and serial numbers 93 by the difference in reflectivity between the mirror surface for the cutting lines and serial numbers 93 and the rough surface 95.

EXAMPLE 7

Figure 22:
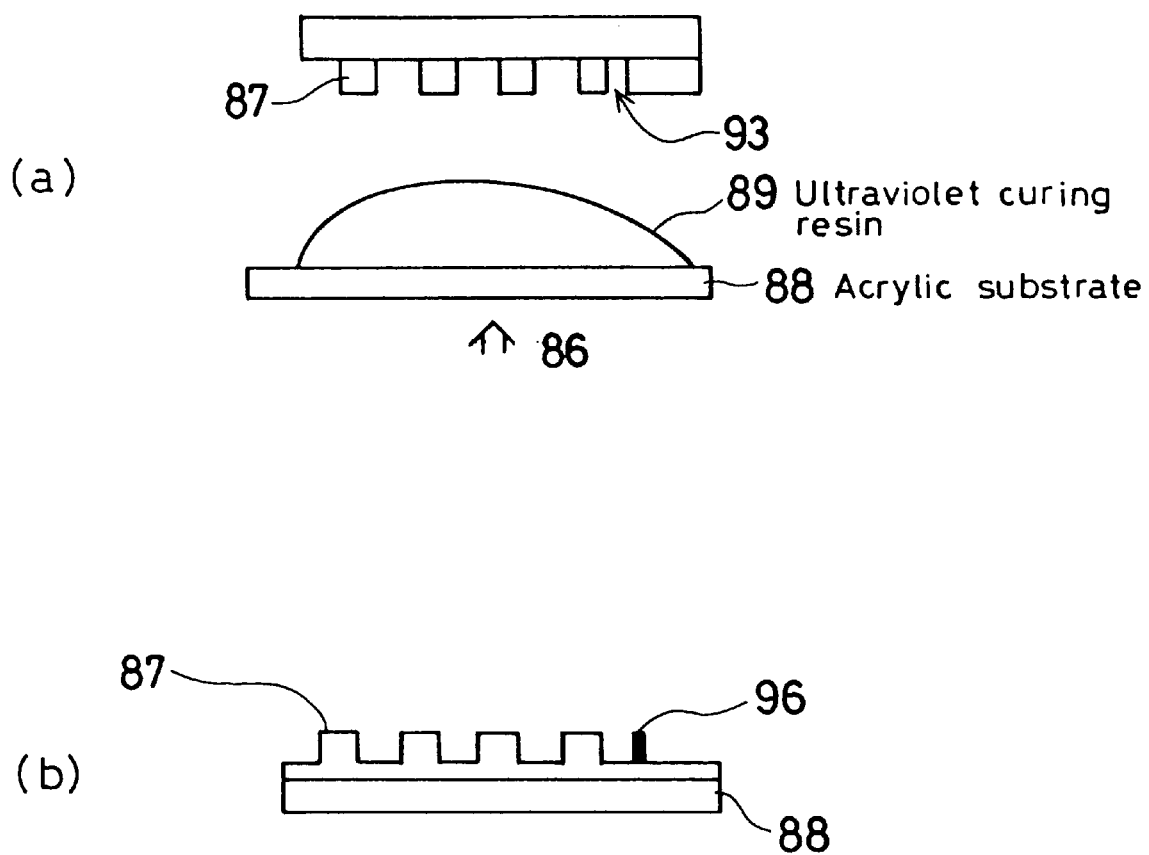
FIGS. 22(a)–22(b) show one example of the cutting line forming method.

As a resist original plate, the plate shown in FIG. 20(*b*) was used. An ultraviolet curing resin material 89 was dropped on an acrylic substrate 88 and brought into close contact with the original plate, as shown in FIG. 22(*a*). Consequently, the ultraviolet curing resin material 89 was extruded from the portion corresponding to the photoresist pattern 87, and the spaces between the projections of the photoresist pattern 87 were filled with the ultraviolet curing resin material 89. In this state, UV light was applied at 450 mJ from the acrylic substrate side. Then, the flexible, acrylic substrate 88 was separated in the same way as in the case of FIG. 11. Thereafter, ultraviolet radiation was applied again to cure the resin material satisfactorily. As a result, a relief hologram optical element having a relief pattern 87, together with cutting lines and serial number 96, which were integrally formed on the same surface, was obtained (see FIG. 22(*b*)).

EXAMPLE 8

A glass substrate was provided thereon with repeated patterns of Cr corresponding to an encoder, and a positive photoresist layer was coated over the Cr repeated patterns by the spinner method for 30 seconds at 1,500 rpm using a positive ultraviolet resist (OFPR800-15CP, manufactured by Tokyo Oka Kogyo K.K.) as a photoresist, thereby preparing a dry plate.

Then, ultraviolet radiation was applied at 13 mJ/cm$^2$ from the glass substrate side. Thereafter, with a ground glass plate placed close on the photoresist, ultraviolet radiation was first applied through the ground glass plate at 1.5 mJ/cm$^2$. After being rotated, the ground glass plate was brought into close contact with the photoresist again. Then, ultraviolet radiation was applied at 1.5 mJ/cm$^2$ in the same way as the above. This was done for the purpose of making the condition of roughness of the rough surface, which was to be produced, even more random.

Figure 3:
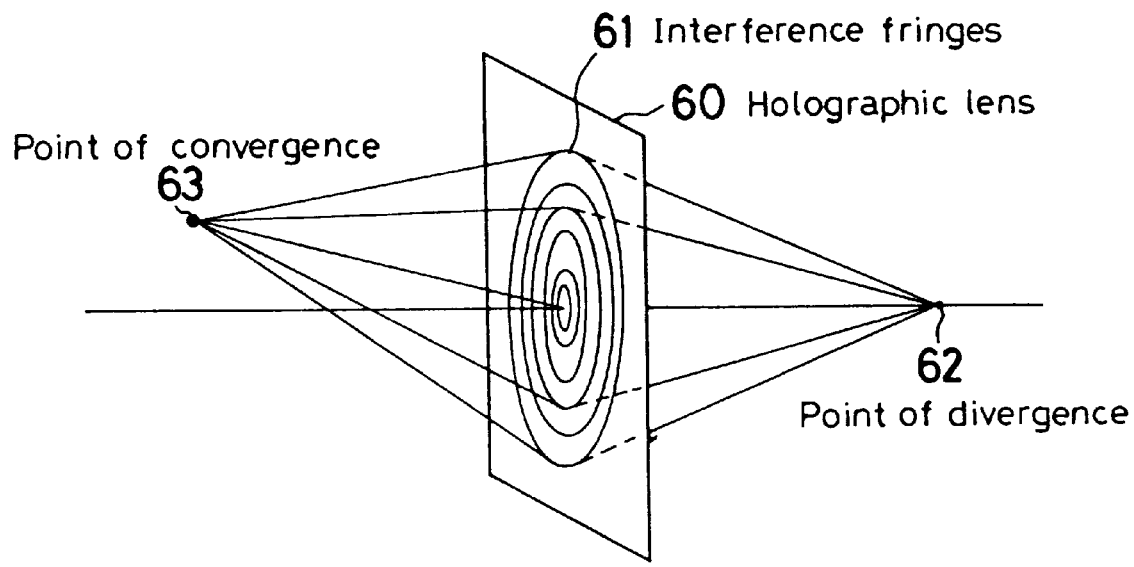
FIG. 3 illustrates interference fringes of a holographic lens.
Figure 4:
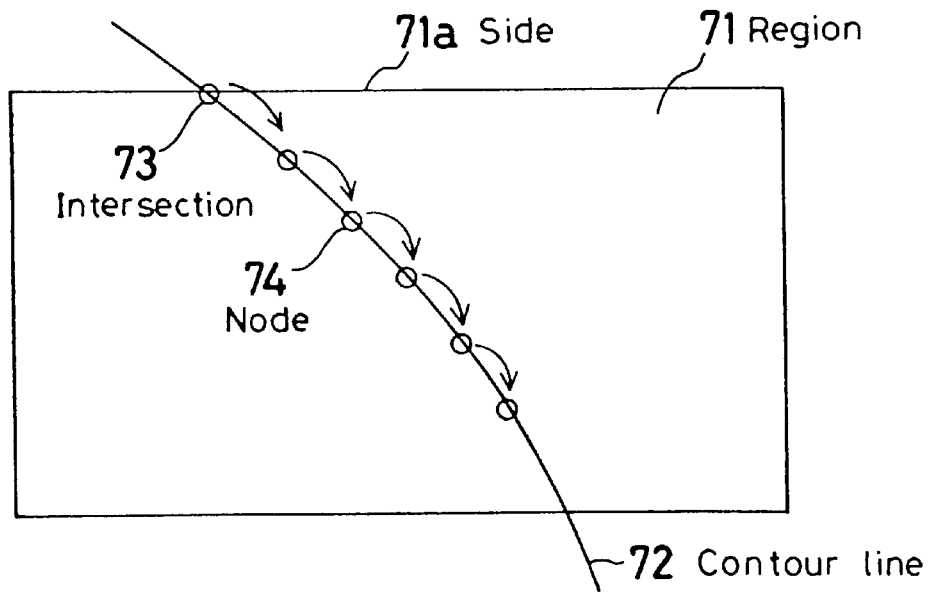
FIG. 4 shows a procedure for generating a contour line according to the present invention.
Figure 5:
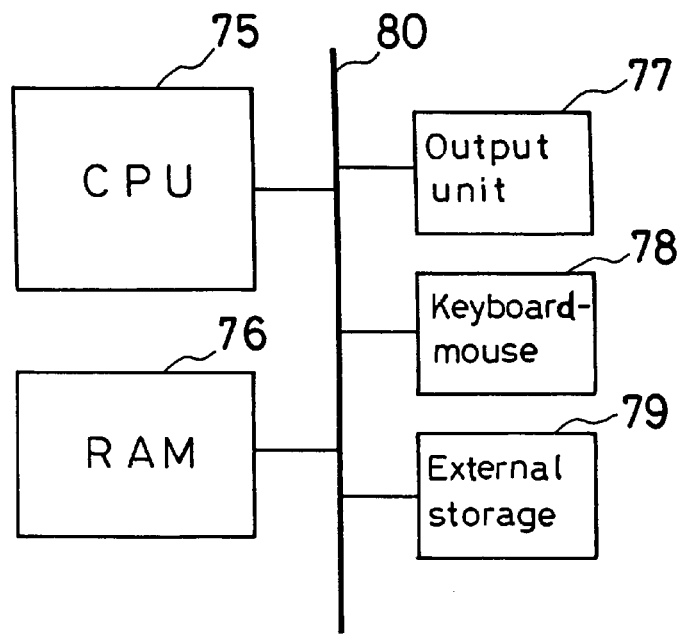
FIG. 5 is a block diagram showing the arrangement of a system for generating contour lines.
Figure 6A:
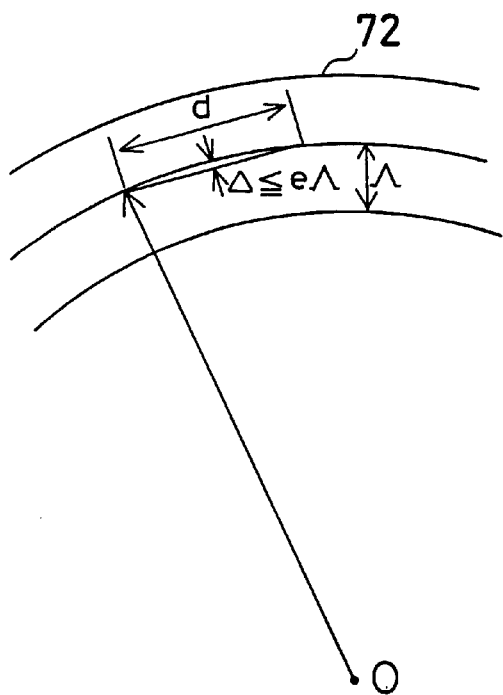
FIGS. 6(a)–6(b) are views for explanation of Λ of contour lines and a side of a polygon approximating a contour line.
Figure 6B:
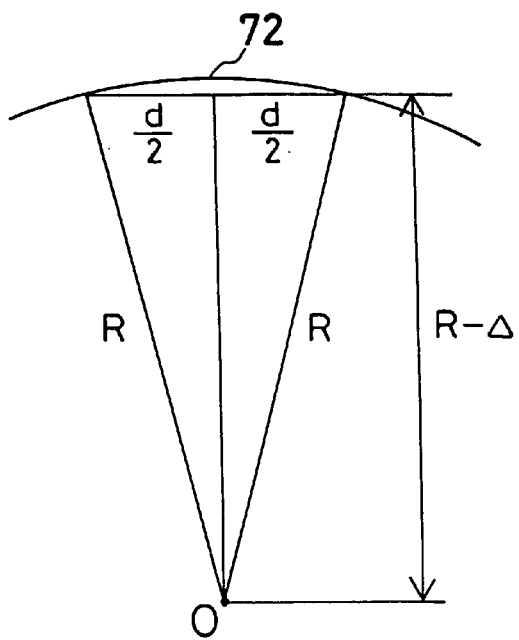
Figure 7:
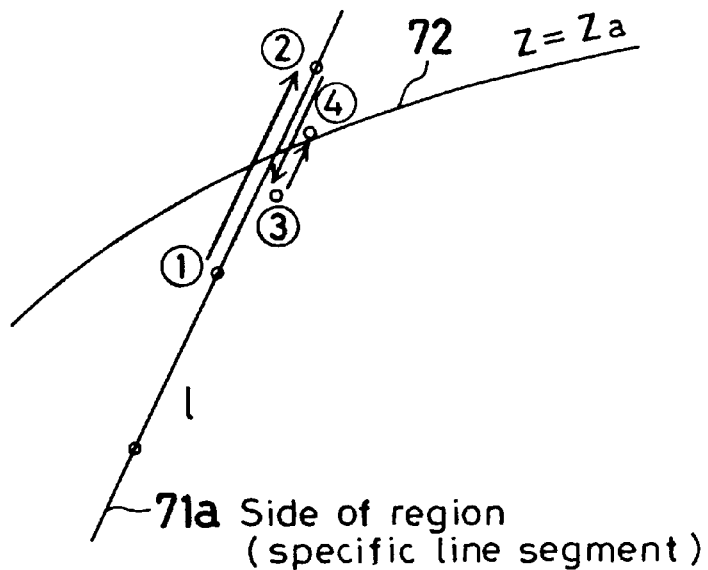
FIG. 7 illustrates a method of obtaining a point of intersection of a contour line and a specific line segment.
Figure 8:
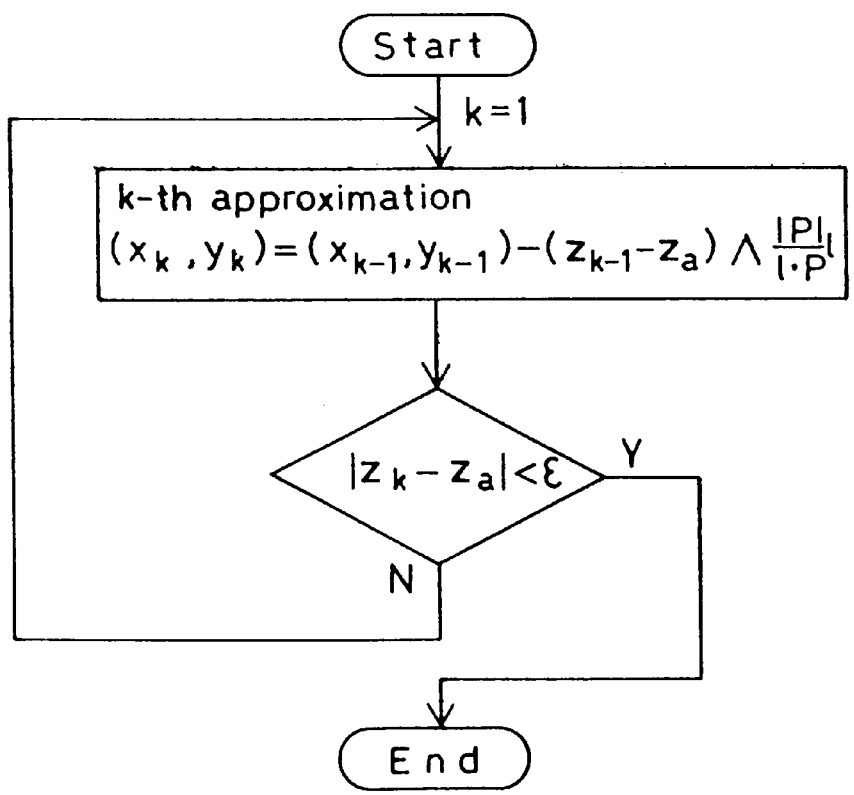
FIG. 8 is a flowchart showing successive approximation processing.
Figure 9:
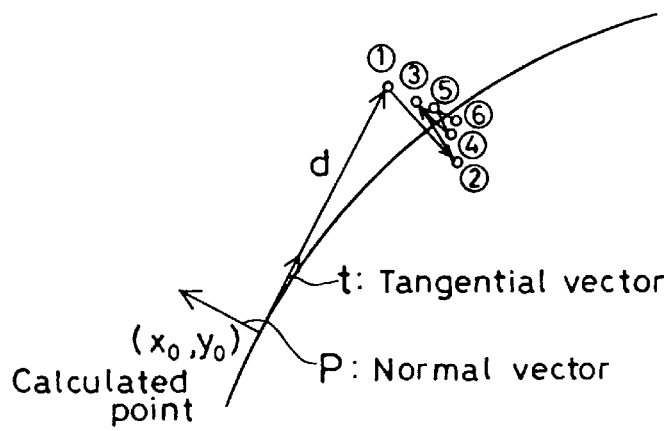
FIG. 9 illustrates a method of obtaining a neighboring point on the basis of a point already calculated.
Figure 10:
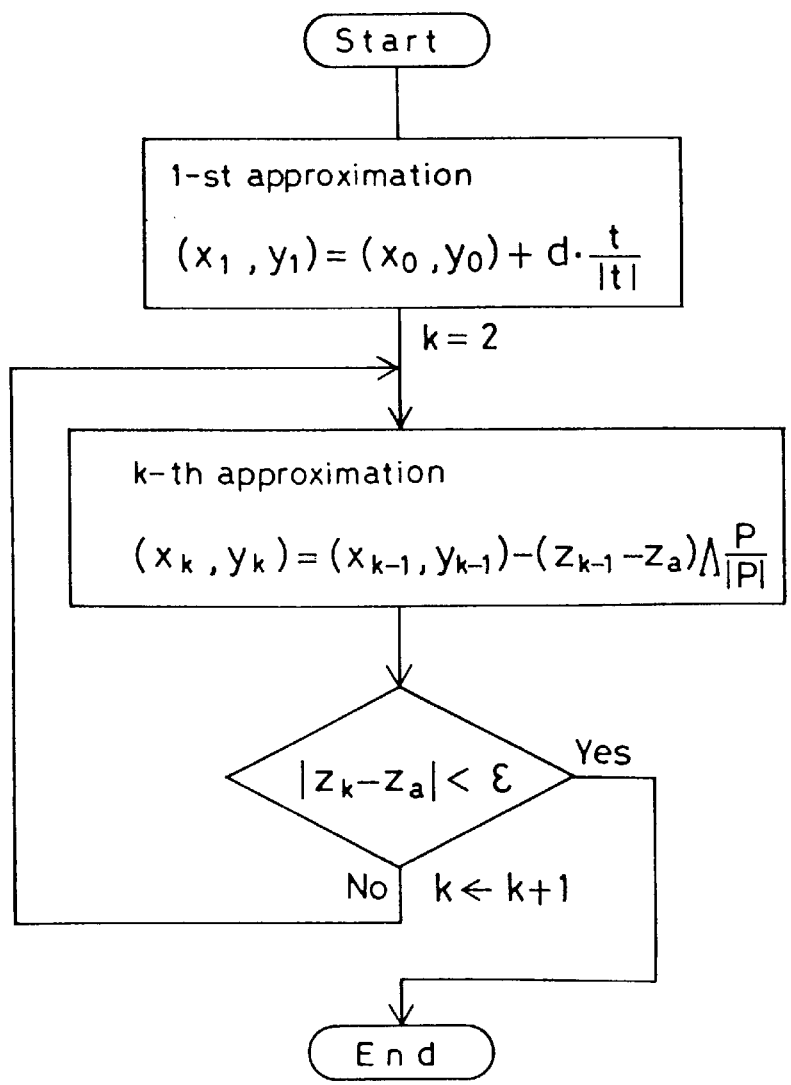
FIG. 10 is a flowchart showing successive approximation processing.
Figure 12A:
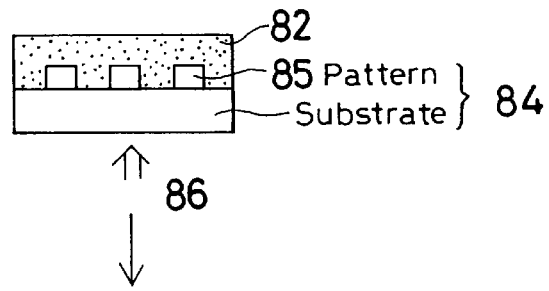
FIGS. 12(a)–12(f) show one example in which a plate made of a resin material is used as an original plate.
Figure 12B:
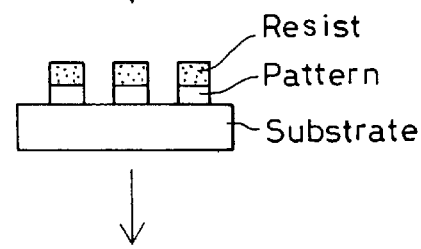
Figure 12C:
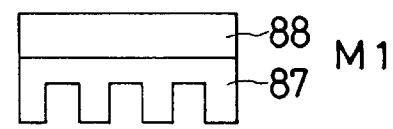
Figure 12D:
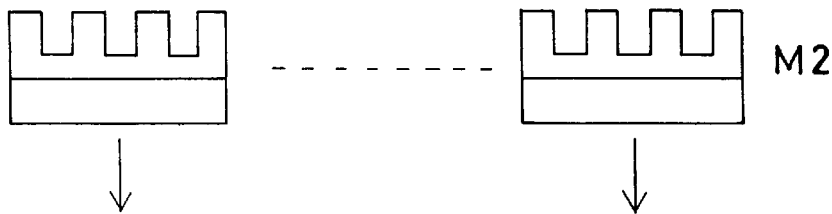
Figure 12E:
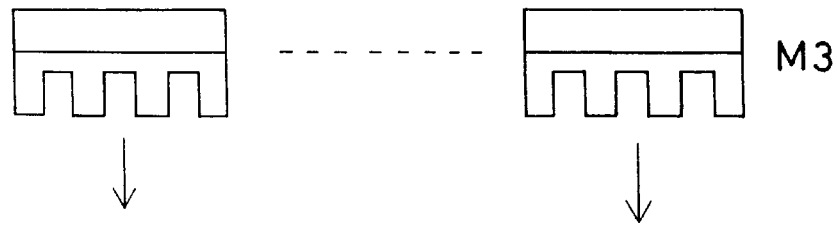
Figure 12F:
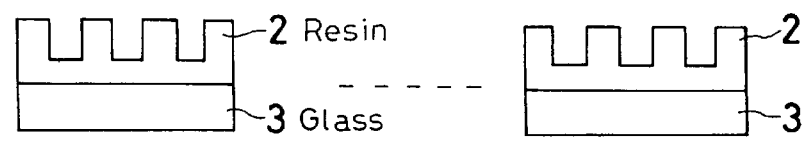
Figure 13:
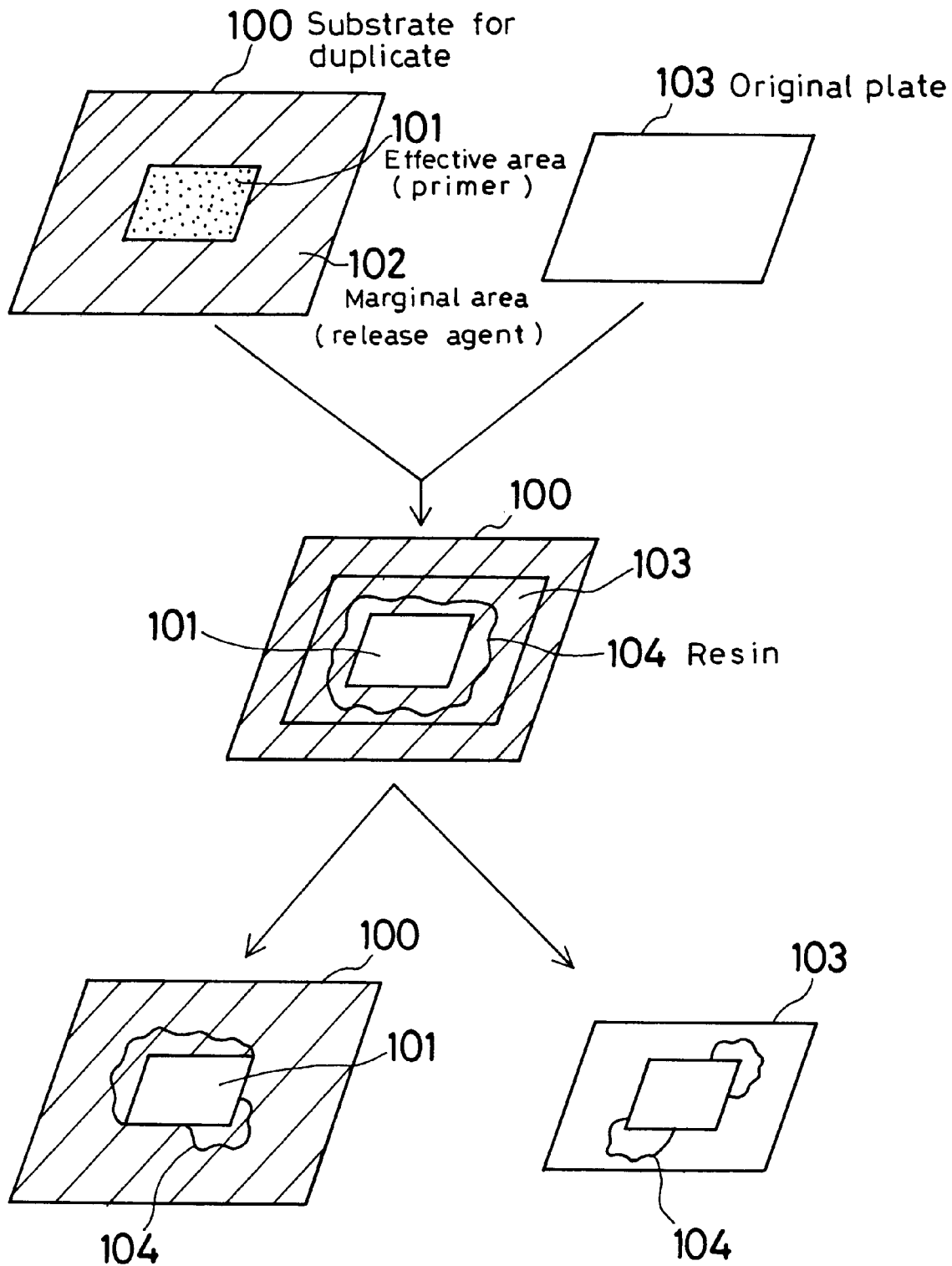
FIG. 13 illustrates a process of duplicating a relief pattern from a relief plate using a flexible substrate.
Figure 14:
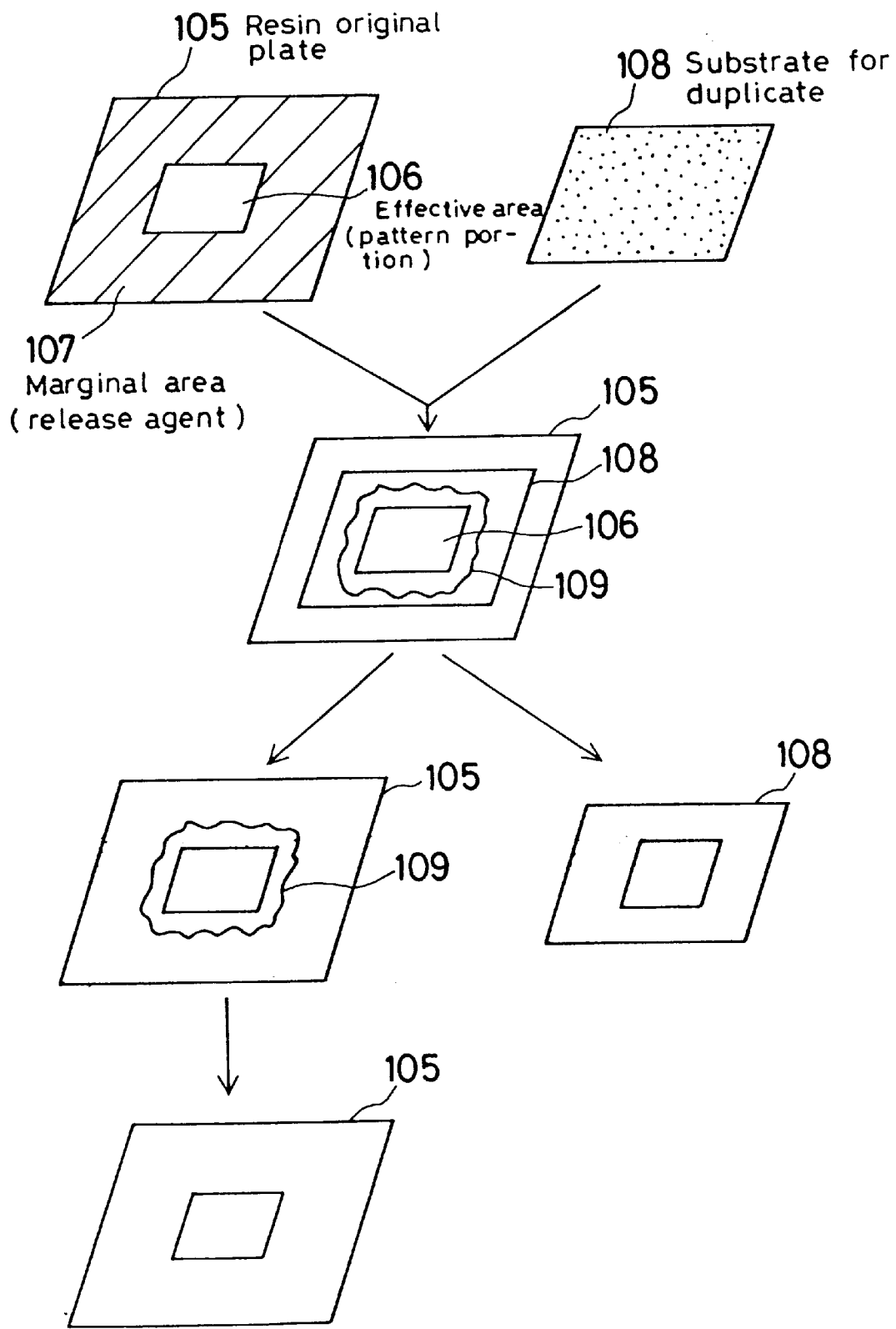
FIG. 14 illustrates another process of duplicating a relief pattern from a relief plate using a flexible substrate.
Figure 15:
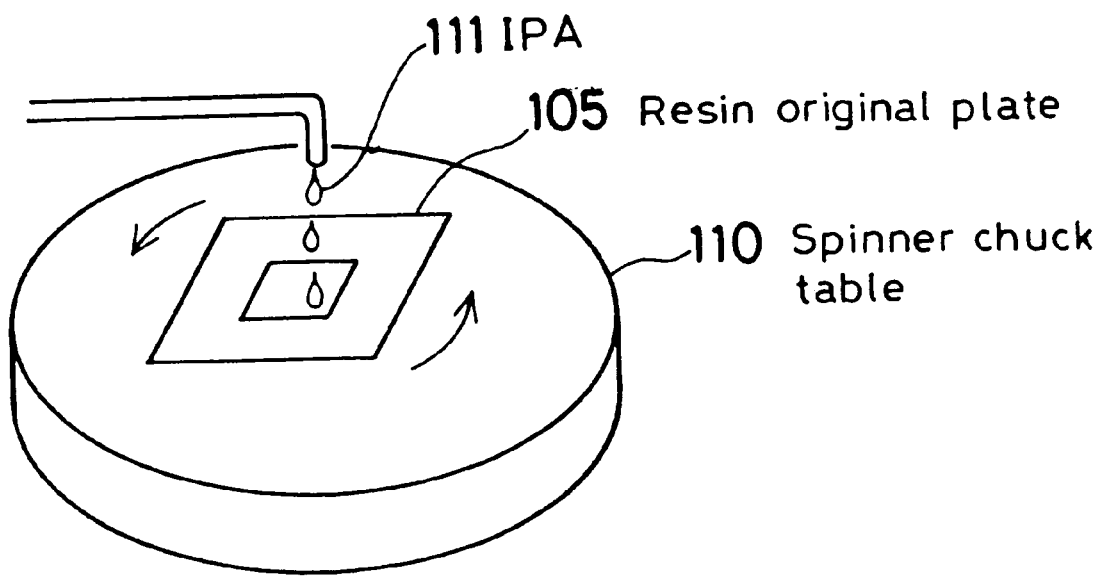
FIG. 15 illustrates cleaning of an original plate made of a resin material.
Figure 16:
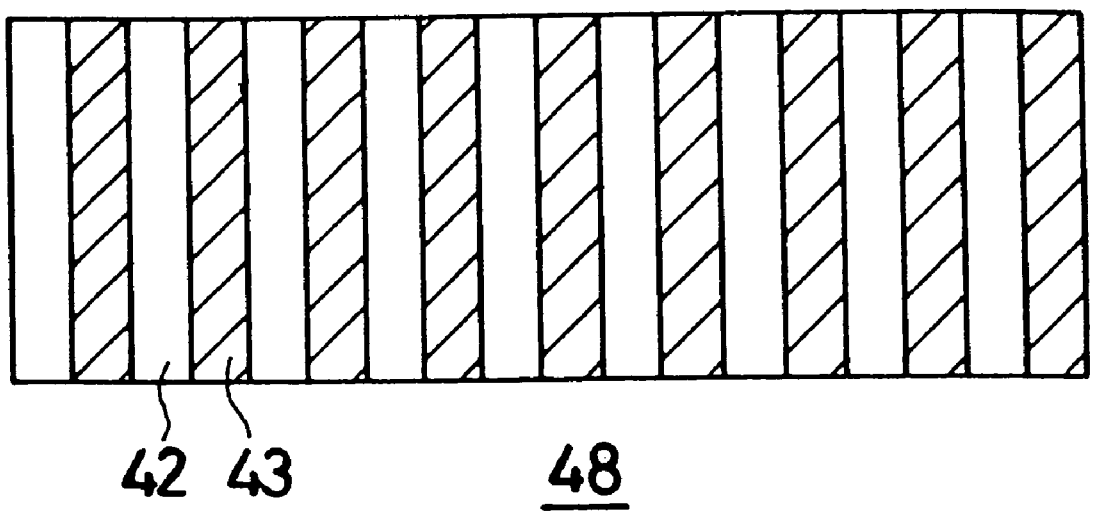
FIG. 16 illustrates the encoder of the present invention.

Next, the exposed dry plate was developed by using NMD-3, manufactured by Tokyo Oka Kogyo K.K., as a developer, thereby obtaining a repeated pattern structure as shown in FIG. 3(*c*).

The repeated pattern structure thus obtained was plated with Ni to prepare a Ni pattern plate. From the Ni pattern plate, a duplicate was produced on a glass substrate by the method shown in FIGS. 17(*a*)–17(*f*) using an ultraviolet curing resin. In this process, the surface of the glass substrate was first treated with γ-methacryloxypropyl trimethoxy silane (KBM503, manufactured by Shinetsu Chemical Industry Co., Ltd.). For this purpose, first, KBM503 was dissolved in isopropyl alcohol under stirring for 1 hour to obtain a 0.5 wt % solution. With 6 to 8 ml of the solution being dropped on the glass substrate, spin coating was carried out at 300 rpm for the first 5 seconds and then at 500 rpm for the following 15 seconds. Then, baking was carried out for 30 minutes at 120° C. to make the glass substrate and the KBM 503 adhere to each other, thereby forming a silane coupling agent layer on the substrate.

Next, an ultraviolet curing resin composition was prepared by mixing together 20 parts by weight of N-vinyl-2-pyrrolidone, 25 parts by weight of dicyclopentenyl acrylate (FA-511A, manufactured by Hitachi Chemical Co., Ltd.), 52 parts by weight of oligoester acrylate (M-8060, manufactured by Toa Gosei Chemical Industry Co., Ltd.), and 3 parts by weight of 1-hydroxycyclohexyl phenyl ketone (Irg184, manufactured by Ciba-Geigy Ltd.). Then, 0.7 ml of the composition was dropped on the silane coupling agent layer provided on the substrate, and the Ni pattern plate was placed on the composition. Then, a pressure of 6 kg/cm$^2$ was applied to the Ni pattern plate to spread the resin composition in excess of the pattern region of the Ni pattern plate. Further, light of wavelength 365 nm emitted from an ultra-high pressure mercury lamp was applied for 30 seconds at 250 mJ/cm$^2$ from the glass substrate side to cure the ultraviolet curing resin composition. Then, with air being applied from an ionizer, the Ni pattern plate was separated, thereby producing a duplicate on the glass substrate.

The surface of the duplicate was subjected to ion bombardment treatment for the purpose of improving the adhesive properties. Thereafter, a SiO layer having a thickness of 300 Å, an aluminum layer having a thickness of 1,200 Å, and a SiO layer having a thickness of 3,950 Å were successively deposited on the duplicate in the mentioned order to form a reflecting layer.

The optical reflector thus produced for use as an encoder was superior in wear resistance, reflectivity, and bond strength.

EXAMPLE 9

Figure 17A:
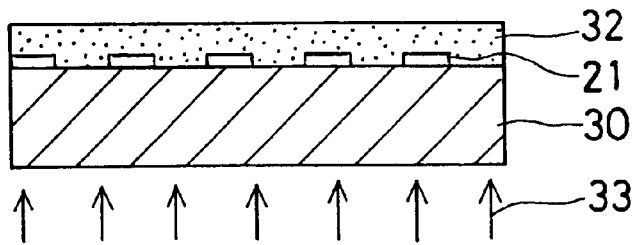
FIGS. 17(a)–17(f) are sectional view showing the process sequence for duplicating one embodiment of the encoder according to the present invention.
Figure 17B:
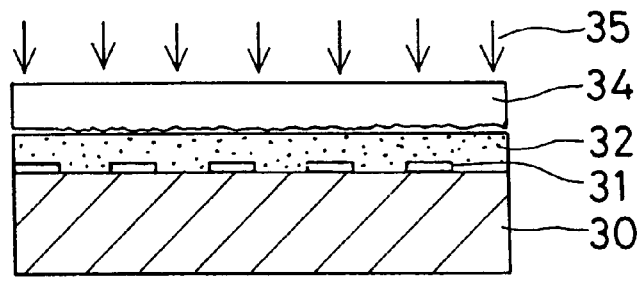
Figure 17C:
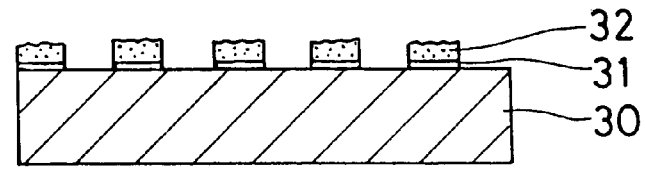
Figure 17D:
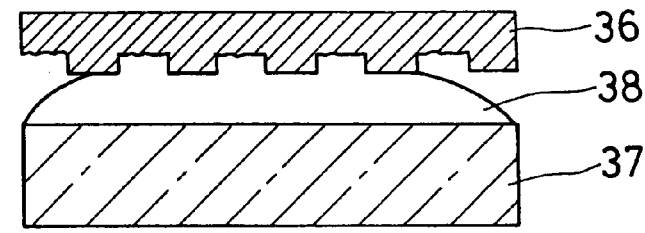
Figure 17E:
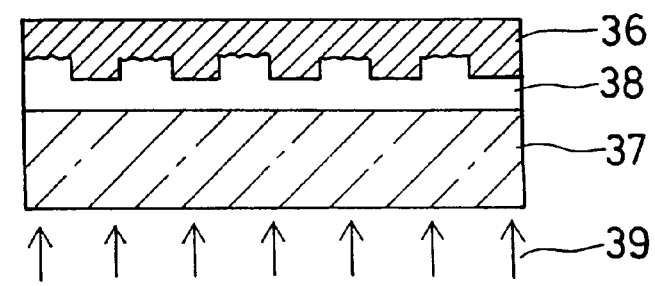
Figure 17F:
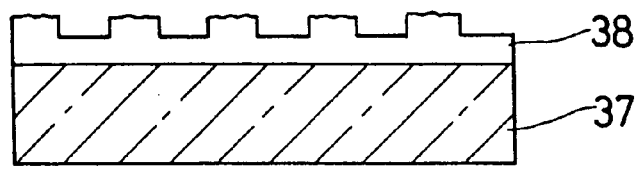
Figure 18:
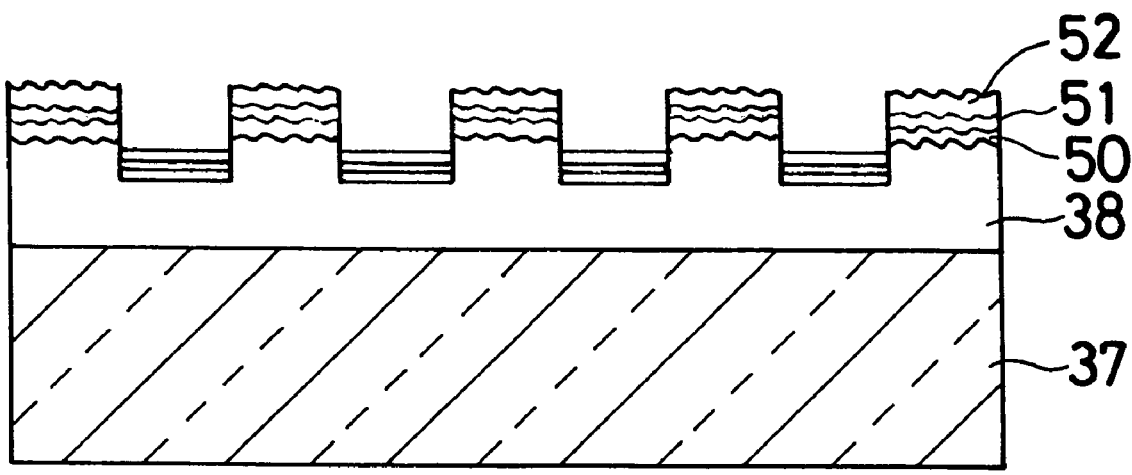
FIG. 18 is a sectional view showing the arrangement of a reflecting layer of one embodiment of the encoder according to the present invention and a method of producing the reflecting layer.

A resist original plate such as that shown in FIG. 17(c) was prepared as follows: Chromium and chromium oxide were deposited by the ordinary sputtering method on a silica glass substrate having a size of 6×6 inches, and an electron beam resist (OEBR-1000, manufactured by Tokyo Oka Kogyo K.K.) was coated thereon. Thereafter, the resist was patterned by electron beam lithography and then developed by using a developer for exclusive use. Next, the chromium layer exposed through the resist openings was etched by using ferric chloride. Thereafter, the resist was removed by using a remover (manufactured by Tokyo Oka Kogyo K.K.).

A positive ultraviolet resist (OFPR-800, manufactured by Tokyo Oka Kogyo, K.K.) was coated over the pattern of the chromium mask thus produced. With a ground glass plate placed close on the resist, ultraviolet radiation was applied at 5 mJ/cm$^2$ from the ground glass plate side by using an ultraviolet lamp (H bulb, manufactured by FUSION). Thereafter, ultraviolet radiation was applied at 100 mJ/cm$^2$ from the silica glass substrate side by using the same ultraviolet lamp, and development treatment was carried out by using NMD-3 (manufactured by Tokyo Oka Kogyo K.K.).

Next, a plate (resin pattern plate) for duplication was prepared by using the resist plate prepared by the above-described method as an original plate. An acrylic substrate having a size of 200×200 mm and a thickness of 1.2 mm was prepared, and it was coated with a primer (GK, manufactured by The Inktec) as an adhesive layer by using a spinner. Then, 5 ml of an ultraviolet curing resin material (SEL Clear, manufactured by The Inktec) was dropped on the acrylic substrate coated with the adhesive layer, and the resist plate was brought into close contact with the ultraviolet curing resin material with the pattern side facing down. Thereafter, a pressure of 1.0 kg/cm$^2$ was applied with a press to effect pressing for 30 seconds. After the pressing process, ultraviolet radiation was applied at at least 1.5 J/cm$^2$ to cure the resin material. After the resin material had been cured, the resist plate was separated.

An encoder was produced by using the plate for duplication prepared by the above-described method as follows: A soda glass substrate having a size of 6×6 inches and a thickness of 0.55 mm was prepared, and as a silane coupling agent KBM-503 (manufactured by Shinetsu Chemical Industry Co., Ltd.) was coated on the glass substrate by using a spinner. Then, 0.3 ml of an ultraviolet curing resin material (OMC Clear, manufactured by The Inktec) was dropped on the plate for duplication, and the glass substrate was brought into close contact with the ultraviolet curing resin material with the silane coupling agent coating surface facing down. Thereafter, a pressure of 1.0 kg/cm$^2$ was applied with a press to effect pressing for 10 seconds. After the pressing process, ultraviolet radiation was applied at at least 0.15 J/cm$^2$ to cure the ultraviolet resin material. After the resin material had been cured, the plate for duplication was separated.

Then, reflecting layers were deposited in the following order and with the following thicknesses:

Third layer . . . SiO (300±Å)

Second layer . . . Al (1,200±120Å)

First layer . . . SiO (thickness at which the reflectivity of the high-reflectivity regions was not less than 75% at a wavelength of 785±15 nm)

It should be noted that the deposition of SiO was carried out at a deposition rate of 2 Å/sec. The reflectivity was determined on the basis of the film thickness by using data on reflectivity which had previously been obtained for each film thickness.

The encoder thus produced was superior in wear resistance, reflectivity, and bond strength.

Although the optical reflector and production method therefor according to the present invention have been described on the basis of Examples taking an encoder as an example, it should be noted that the present invention is not necessarily limited to these examples and that various changes and modifications may be imparted thereto. For example, the repeated pattern structure shown in FIG. 17(c) may be produced by embossing. In addition, the reflector is not necessarily limited to encoders but may be other reflector devices, e.g., optical memory devices.

As will be clear from the foregoing description, in a molded article using glass as a substrate according to the present invention, a glass substrate is provided thereon with a molded form made of an ionizing radiation curing resin composition containing an ionizing radiation curing compound which comprises N-vinyl-2-pyrrolidone, tetrahydrofurfuryl acrylate, or tetrahydrofurfuryl methacrylate, and a layer of a silane coupling agent is provided between the layer of the ionizing radiation curing resin composition and the glass substrate. Accordingly, it is possible to obtain a favorable molded article in which the resin composition layer will not readily peel off nor change its properties even if there are changes in environmental conditions, e.g., temperature change, humidity change, etc.

The holographic optical element of the present invention comprises a glass substrate, a radiation-cured resin layer having a hologram relief pattern on the surface thereof, and a silane coupling agent layer provided between the glass substrate and the radiation-cured resin layer. The holographic optical element is produced by a method wherein a resist relief pattern formed by electron beam lithography and resist development process is used as an original plate, and the pattern of the plate is stamped on a substrate by curing of an ultraviolet curing resin material, thereby forming a duplicate plate. Alternatively, the pattern of the duplicate plate is further stamped to obtain another duplicate plate, and the pattern of the duplicate plate is duplicated by another radiation curing resin material on a glass substrate treated with a silane coupling agent. Accordingly, it is possible to obtain a favorable holographic optical element in which radiation-cured resin layer will not readily peel off nor change its properties even if there are changes in environmental conditions, e.g., temperature change, humidity change, etc.

In addition, the optical reflector of the present invention comprises a first layer of SiO, a second layer of Al, a third layer of SiO, a resin layer whose surface is composed of repeated patterns of mirror and rough surfaces, and a base layer, which are stacked in the mentioned order from the light entrance side. Accordingly, it is possible to obtain an optical reflector having repeated patterns, e.g., an encoder, which is superior in wear resistance, bond strength and light-reflecting properties.

The encoder of the present invention comprises a glass substrate, a deposited film layer as the outermost layer, an ultraviolet-cured resin layer whose surface is composed of repeated patterns of mirror and rough surfaces, and a silane coupling agent layer provided between the glass substrate and the ultraviolet-cured resin layer. Accordingly, it is possible to obtain an encoder which is superior in wear resistance, bond strength and light-reflecting properties.

What we claim is:

1. A holographic optical element adapted to generate interference fringes of the same pitch as that of tracks formed on a magnetic recording disk or repeated patterns formed on an encoder by interference between two light beams emerging from two different holographic lens regions, said holographic optical element comprising a glass substrate, a radiation-cured resin layer having a hologram relief pattern on the surface thereof, and a silane coupling agent layer provided between said glass substrate and said radiation-cured resin layer, said radiation-cured resin layer comprising an acrylic oligomer, an acrylic monomer, N-vinyl-2-pyrrolidone and a photo-curing initiator, the interference fringes of said holographic lens being contour lines given by a topological function $\phi$ which satisfies the following condition:

$$\phi = \phi(x, y) \quad (1)$$
$$= \sum_{m=0}^{10} \sum_{n=0}^{10} C_j x^m y^n \quad (j = \{(m+n)^2 + m + 3n\}/2)$$
$$= C_1 x + C_2 y + C_3 x^2 + C_4 xy + C_5 y^2 + \ldots + C_{64} xy^9 + C_{65} y^{10}$$

where x and y are orthogonal coordinates on the hologram, and $C_j$ is a constant determined for each particular hologram;

said element being obtained by cutting along a cutting line formed from a relief pattern.

2. A holographic optical element according to claim 1, wherein the focal length of said holographic lens is not longer than 45 mm.

3. A holographic optical element according to claim 1, wherein said radiation-cured resin layer has a thickness of 5 $\mu$m to 30 $\mu$m.

4. A holographic optical element according to claim 1, wherein the refractive index for the spectral d-line by sodium of said radiation-cured resin layer is not less than 1.45.

5. A holographic optical element according to claim 1, wherein the relief depth of said relief pattern is in the range of 0.7 $\mu$m to 1.0 $\mu$m.

6. A holographic optical element according to claim 1, wherein the ratio of the width of relief projections of said relief pattern to the pitch thereof is in the range of 0.4 to 0.6.

7. A holographic optical element according to claim 1, wherein the cross-section of the relief projections of said relief pattern is rectangular; alternatively, the angle of inclination of the side surface thereof which is tangent to the hologram relief surface is within 5° with respect to the normal.

8. A holographic optical element according to claim 1, wherein the ratio of the intensity of zero-order diffracted light to the intensity of first-order diffracted light of wavelength 785±15 nm is not higher than 10%.

9. A holographic optical element according to claim 1, wherein the light transmittance is not lower than 80% in the wavelength range of 400 nm to 900 nm.

10. A holographic optical element according to claim 1, wherein the degree of smoothness of the surface tangent to the hologram relief surface is not more than 30 $\mu$m.

11. A holographic optical element according to claim 1, wherein said radiation-cured resin layer contains an oligomer having a glass transition temperature of not lower than 40° C.

12. A holographic optical element according to claim 1, wherein said silane coupling agent layer contains γ-methacryloxypropyl trimethoxy silane as a principal component.

13. A holographic optical element according to claim 1, wherein said holographic lens is a computer generated hologram.

14. A holographic optical element according to claim 1, which is used as an imaging element for controlling the track position of a read/write head of a high-density magnetic recording disk unit.

15. A holographic optical element adapted to generate interference fringes of the same pitch as that of tracks formed on a magnetic recording disk or repeated patterns formed on an encoder by interference between two light beams emerging from two different holographic lens regions, said holographic optical element comprising a glass substrate, a radiation-cured resin layer having a hologram relief pattern on the surface thereof, and a silane coupling agent layer provided between said glass substrate and said radiation-cured resin layer, said radiation-cured resin layer comprising an acrylic oligomer, an acrylic monomer, N-vinyl-2-pyrrolidone and a photo-curing initiator.

16. A holographic optical element adapted to generate interference fringes of the same pitch as that of tracks formed on a magnetic recording disk or repeated patterns formed on an encoder by interference between two light beams emerging from two different holographic lens regions, said holographic optical element comprising a glass substrate, a radiation-cured resin layer having a hologram relief pattern on the surface thereof, and a silane coupling agent layer provided between said glass substrate and said radiation-cured resin layer, the interference fringes of said holographic lens being contour lines given by a topological function $\phi$ which satisfies the following condition:

$$\phi = \phi(x, y) \quad (1)$$
$$= \sum_{m=0}^{10} \sum_{n=0}^{10} C_j x^m y^n \quad (j = \{(m+n)^2 + m + 3n\}/2)$$
$$= C_1 x + C_2 y + C_3 x^2 + C_4 xy + C_5 y^2 + \ldots + C_{64} xy^9 + C_{65} y^{10}$$

where x and y are orthogonal coordinates on the hologram, and $C_j$ is a constant determined for each particular hologram.

17. A holographic optical element adapted to generate interference fringes of the same pitch as that of tracks formed on a magnetic recording disk or repeated patterns formed on an encoder by interference between two light beams emerging from two different holographic lens regions, said holographic optical element comprising a glass substrate, a radiation-cured resin layer having a hologram relief pattern on the surface thereof, and a silane coupling agent layer provided between said glass substrate and said radiation-cured resin layer, said optical element being obtained by cutting along a cutting line formed from a relief pattern.

18. A holographic optical element according to claim 17, which is provided with an identification symbol formed from a relief pattern.

* * * * *